(12) United States Patent
Tuttle et al.

(10) Patent No.: US 8,174,415 B2
(45) Date of Patent: May 8, 2012

(54) BROADCAST AM RECEIVER, FM RECEIVER AND/OR FM TRANSMITTER WITH INTEGRATED STEREO AUDIO CODEC, HEADPHONE DRIVERS AND/OR SPEAKER DRIVERS

(75) Inventors: G. Tyson Tuttle, Austin, TX (US); Wade R. Gillham, Austin, TX (US); Dan B. Kasha, Seattle, WA (US)

(73) Assignee: Silicon Laboratories Inc., Austin, TX (US)

( * ) Notice: Subject to any disclaimer, the term of this patent is extended or adjusted under 35 U.S.C. 154(b) by 1341 days.

(21) Appl. No.: 11/824,596

(22) Filed: Jun. 29, 2007

(65) Prior Publication Data

US 2008/0051918 A1 Feb. 28, 2008

Related U.S. Application Data

(63) Continuation-in-part of application No. 11/396,097, filed on Mar. 31, 2006.

(60) Provisional application No. 60/881,747, filed on Jan. 22, 2007.

(51) Int. Cl.
*H03M 1/00* (2006.01)
(52) U.S. Cl. .................. 341/110; 341/144; 341/155
(58) Field of Classification Search .............. 341/144, 341/155, 110; 455/445, 11.1, 518
See application file for complete search history.

(56) References Cited

U.S. PATENT DOCUMENTS

| | | | |
|---|---|---|---|
| 5,129,098 A | 7/1992 | McGirr et al. | |
| 5,220,557 A | 6/1993 | Kelley | |
| 5,619,531 A | 4/1997 | Taylor et al. | |
| 6,055,429 A * | 4/2000 | Lynch | 455/445 |
| 6,590,943 B1 | 7/2003 | Ali | |
| 7,053,805 B2 | 5/2006 | Chang et al. | |
| 7,596,356 B2 * | 9/2009 | Rofougaran et al. | 455/73 |
| 2003/0203743 A1 | 10/2003 | Sugar et al. | |
| 2004/0064043 A1 | 4/2004 | Rielly et al. | |
| 2004/0106380 A1 | 6/2004 | Vassiliou et al. | |
| 2004/0219884 A1 | 11/2004 | Mo et al. | |
| 2004/0242224 A1 | 12/2004 | Janik et al. | |
| 2005/0113058 A1 | 5/2005 | Goieski, Jr. | |

(Continued)

FOREIGN PATENT DOCUMENTS

CN 14575555 A 11/2003

(Continued)

OTHER PUBLICATIONS

PowerPoint Presentation entitled, "Analogue & Digital Two-Way Radio," Kuala Lumpur, Oct. 2000.

(Continued)

*Primary Examiner* — Brian Young
(74) *Attorney, Agent, or Firm* — Trop, Pruner & Hu, P.C.

(57) ABSTRACT

An apparatus includes processor and a control interface. The processor is adapted to in a first mode of operation, operate as part of one of a wireless receiver and a wireless transmitter and in a second mode of operation. The processor also processes a first audio band signal to generate a second audio band signal. The control interface selects one of the first and second modes of operation.

26 Claims, 16 Drawing Sheets

U.S. PATENT DOCUMENTS

| | | |
|---|---|---|
| 2005/0159116 A1 | 7/2005 | Xiong |
| 2005/0233768 A1 | 10/2005 | Guo et al. |
| 2005/0286660 A1 | 12/2005 | Nysen et al. |
| 2007/0105504 A1 | 5/2007 | Vorenkamp et al. |
| 2007/0168579 A1 | 7/2007 | Croughwell, III et al. |
| 2008/0049817 A1 | 2/2008 | Der |
| 2008/0298456 A1 | 12/2008 | Haggis et al. |

FOREIGN PATENT DOCUMENTS

| | | |
|---|---|---|
| WO | 2004100398 | 11/2004 |

OTHER PUBLICATIONS

PowerPoint Presentation entitled, "CML—New Products and Recent Developments," Jim Carey, Jun. 2000.

U.S. Appl. No. 11/824,568, "Office Action dated Apr. 2, 2010."

U.S. Appl. No. 11/824,568, "Final Office Action dated Nov. 16, 2010."

U.S. Appl. No. 11/824,568, "Office Action dated May 24, 2011."

\* cited by examiner

| Mode | RX | LT | LO | DO | DI | COMMENT |
|------|----|----|----|----|----|---------|
| 1 | 1 | 0 | 0 | 0 | 0 | INVALID MODE |
| 2 | 1 | 0 | 0 | 0 | 1 | INVALID MODE |
| 3 | 1 | 0 | 0 | 1 | 0 | |
| 4 | 1 | 0 | 0 | 1 | 1 | |
| 5 | 1 | 0 | 1 | 0 | 0 | |
| 6 | 1 | 0 | 1 | 0 | 1 | |
| 7 | 1 | 0 | 1 | 1 | 0 | |
| 8 | 1 | 0 | 1 | 1 | 1 | |
| 9 | 1 | 1 | 0 | 0 | 0 | INVALID MODE |
| 10 | 1 | 1 | 0 | 0 | 1 | INVALID MODE |
| 11 | 1 | 1 | 0 | 1 | 0 | |
| 12 | 1 | 1 | 0 | 1 | 1 | |
| 13 | 1 | 1 | 1 | 0 | 0 | |
| 14 | 1 | 1 | 1 | 0 | 1 | |
| 15 | 1 | 1 | 1 | 1 | 0 | |
| 16 | 1 | 1 | 1 | 1 | 1 | |

FIG. 4

| Mode | TX | LT | LI | DO | DI | COMMENT |
|------|----|----|----|----|----|---------|
| 17 | 1 | 0 | 0 | 0 | 0 | INVALID MODE |
| 18 | 1 | 0 | 0 | 0 | 1 | |
| 19 | 1 | 0 | 0 | 1 | 0 | INVALID MODE |
| 20 | 1 | 0 | 0 | 1 | 1 | |
| 21 | 1 | 0 | 1 | 0 | 0 | |
| 22 | 1 | 0 | 1 | 0 | 1 | |
| 23 | 1 | 0 | 1 | 1 | 0 | |
| 24 | 1 | 0 | 1 | 1 | 1 | |
| 25 | 1 | 1 | 0 | 0 | 0 | INVALID MODE |
| 26 | 1 | 1 | 0 | 0 | 1 | |
| 27 | 1 | 1 | 0 | 1 | 0 | INVALID MODE |
| 28 | 1 | 1 | 0 | 1 | 1 | |
| 29 | 1 | 1 | 1 | 0 | 0 | |
| 30 | 1 | 1 | 1 | 0 | 1 | |
| 31 | 1 | 1 | 1 | 1 | 0 | |
| 32 | 1 | 1 | 1 | 1 | 1 | |

FIG. 6

| Mode | LT | LO | LI | DO | DI | COMMENT |
|---|---|---|---|---|---|---|
| 33 | 0 | 0 | 0 | 0 | 0 | INVALID MODE |
| 34 | 0 | 0 | 0 | 0 | 1 | INVALID MODE |
| 35 | 0 | 0 | 0 | 1 | 0 | INVALID MODE |
| 36 | 0 | 0 | 0 | 1 | 1 | |
| 37 | 0 | 0 | 1 | 0 | 0 | INVALID MODE |
| 38 | 0 | 0 | 1 | 0 | 1 | INVALID MODE |
| 39 | 0 | 0 | 1 | 1 | 0 | |
| 40 | 0 | 0 | 1 | 1 | 1 | |
| 41 | 0 | 1 | 0 | 0 | 0 | INVALID MODE |
| 42 | 0 | 1 | 0 | 0 | 1 | |
| 43 | 0 | 1 | 0 | 1 | 0 | INVALID MODE |
| 44 | 0 | 1 | 0 | 1 | 1 | |
| 45 | 0 | 1 | 1 | 0 | 0 | |
| 46 | 0 | 1 | 1 | 0 | 1 | |
| 47 | 0 | 1 | 1 | 1 | 0 | |
| 48 | 0 | 1 | 1 | 1 | 1 | |
| 49 | 1 | 0 | 0 | 0 | 0 | |
| 50 | 1 | 0 | 0 | 0 | 1 | INVALID MODE |
| 51 | 1 | 0 | 0 | 1 | 0 | INVALID MODE |
| 52 | 1 | 0 | 0 | 1 | 1 | |
| 53 | 1 | 0 | 1 | 0 | 0 | INVALID MODE |
| 54 | 1 | 0 | 1 | 0 | 1 | INVALID MODE |
| 55 | 1 | 0 | 1 | 1 | 0 | |
| 56 | 1 | 0 | 1 | 1 | 1 | |
| 57 | 1 | 1 | 0 | 0 | 0 | INVALID MODE |
| 58 | 1 | 1 | 0 | 0 | 1 | |
| 59 | 1 | 1 | 0 | 1 | 0 | INVALID MODE |
| 60 | 1 | 1 | 0 | 1 | 1 | |
| 61 | 1 | 1 | 1 | 0 | 0 | |
| 62 | 1 | 1 | 1 | 0 | 1 | |
| 63 | 1 | 1 | 1 | 1 | 0 | |
| 64 | 1 | 1 | 1 | 1 | 1 | |

FIG. 8

BROADCAST AM RECEIVER, FM RECEIVER AND/OR FM TRANSMITTER WITH INTEGRATED STEREO AUDIO CODEC, HEADPHONE DRIVERS AND/OR SPEAKER DRIVERS

This application claims the benefit under 35 U.S.C. §119(e) to U.S. Provisional Application Ser. No. 60/881,747 entitled, "BROADCAST AM RECEIVER, FM RECEIVER AND/OR FM TRANSMITTER WITH INTEGRATED STEREO AUDIO CODEC, HEADPHONE DRIVERS AND/OR SPEAKER DRIVERS," which was filed on Jan. 22, 2007 and is a continuation-in-part of U.S. patent application Ser. No. 11/396,097, entitled, "TRANSCEIVER HAVING MULTIPLE SIGNAL PROCESSING MODES OF OPERATION," filed on Mar. 31, 2006. Each of these prior applications is hereby incorporated by reference in its entirety.

BACKGROUND

The invention generally relates to broadcast am receiver, fm receiver and/or fm transmitter with integrated stereo audio codec, headphone drivers and/or speaker drivers.

Devices exist that provide FM transmitter functionality for short range communication of audio content to an FM receiver. For example, an FM transmitter may be used to transmit audio content from a portable music player to an FM receiver in a vehicle. The FM transmitter transmits on a particular FM frequency, and then the vehicle FM receiver is tuned to that FM frequency to receive and output the audio content.

Other devices exist that provide audio broadcast reception and audio reproduction to allow users to hear music and other content broadcast by audio broadcasters. In addition, many devices will output this audio content through speakers and/or headphones. The speakers and headphones will typically require speaker driver circuitry and headphone driver circuitry. In addition, some devices attempt to provide stereo audio decoding, equalizer functionality, and other more complex audio processing. This audio processing is typically accomplished using an audio CODEC (coder/decoder). For example, for one existing solution, an analog audio tuner is provided in one or more integrated circuits and one or more additional integrated circuits is used to provide the CODEC and driver functionality.

The current solutions are not efficient and suffer from requiring a number of different integrated circuits.

SUMMARY

In an embodiment of the invention, an apparatus includes processor and a control interface. The processor is adapted to in a first mode of operation, operate as part of one of a wireless receiver and a wireless transmitter and in a second mode of operation. The processor also processes a first audio band signal to generate a second audio band signal. The control interface selects one of the first and second modes of operation.

Advantages and other features of the invention will become apparent from the following drawing, description and claims.

BRIEF DESCRIPTION OF THE DRAWING

FIG. 4 is a table illustrating different submodes for the FM receive mode of the multimode FM transceiver according to an embodiment of the invention.

FIG. 6 is a table illustrating different submodes for the FM transmit mode of the multimode FM transceiver according to an embodiment of the invention.

FIG. 8 is a table illustrating different submodes for the audio mode of the multimode FM transceiver according to an embodiment of the invention.

DETAILED DESCRIPTION

Figure 1:
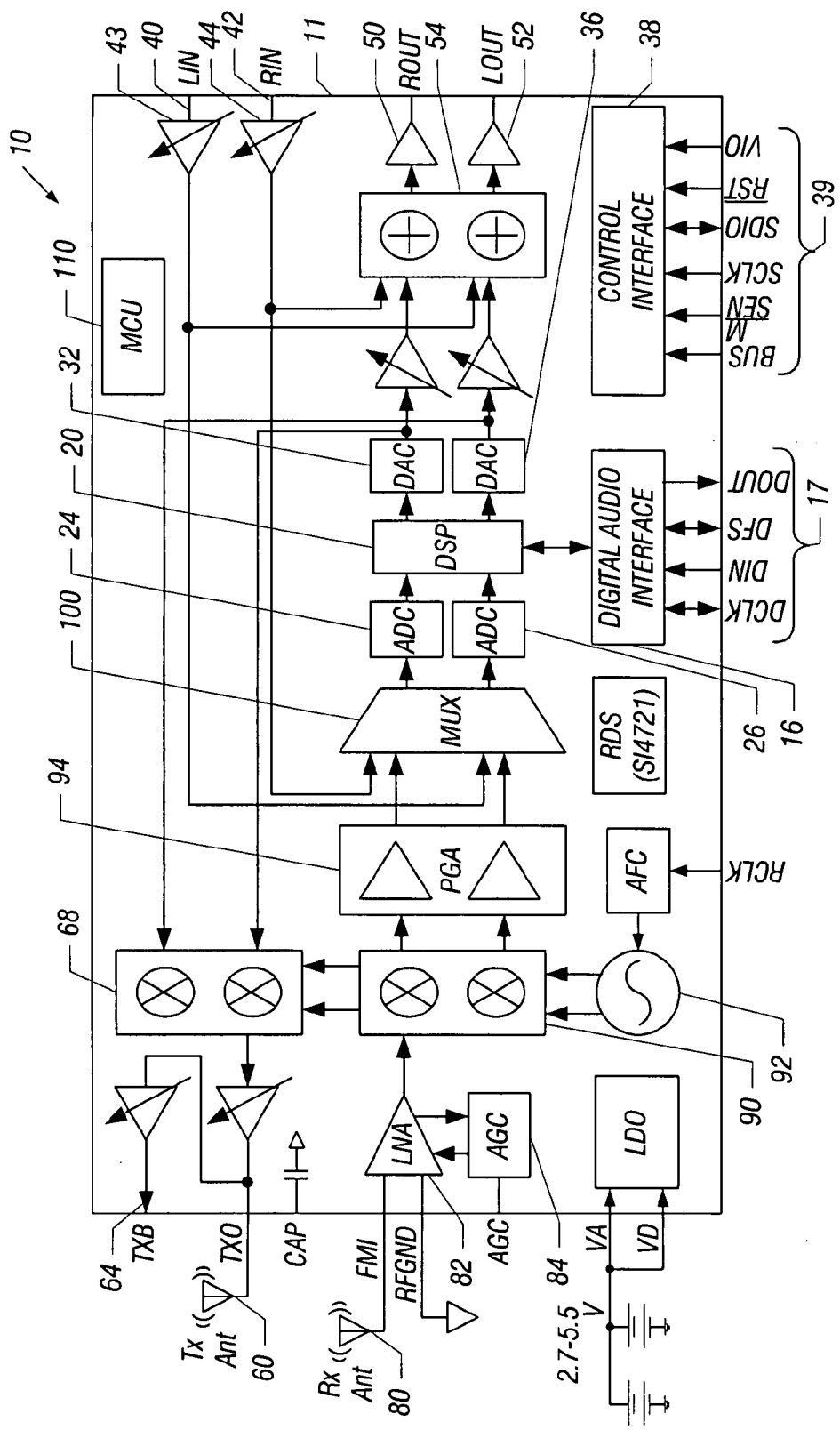
FIG. 1 is a schematic diagram of a multimode FM transceiver according to an embodiment of the invention.

Referring to FIG. 1, in accordance with embodiments of the invention described herein, a multimode frequency modulation (FM) transceiver 10, which may be fabricated on a monolithic semiconductor die 11, has several different signal processing modes of operations, in which the transceiver 10 performs FM transmission, FM reception, analog mixing, digital mixing and codec functions. More specifically, as described herein, the multimode FM transceiver 10 has an FM transmit mode in which the transceiver 10 functions as an FM transmitter; an FM receive mode in which the transceiver 10 functions as an FM receiver; and an audio mode in which the transceiver 10 functions as a codec. In each of these modes of operation, the multimedia FM transceiver 10 may perform various analog and/or digital mixing functions. Additionally, in accordance with some embodiments of the invention, the multimode FM transceiver 10 includes a digital audio interface 16, which allows the communication of digital audio signals between the transceiver 10 and circuitry ("off-chip" circuitry, for example) that is external to the transceiver 10.

In accordance with embodiments of the invention, which are described herein, the FM transmit, FM receive and audio modes are orthogonal in that the multimode FM transceiver 10 is in only one of the modes at a time. However, it is understood that in other embodiments of the invention, the multimode FM transceiver may operate in two or more of the FM receive, FM transmit and audio modes concurrently.

In general, the multimode FM transceiver 10 may receive one or more of the following input source signals in accordance with some embodiments of the invention: a digital audio (called "DIN"), which is received through the digital audio interface 16; an incoming radio frequency (RF) signal that is received from an external receive antenna 80; a digital audio band signal that is received from the digital audio interface 16; and left channel (called "LIN") and right channel (called "RIN") analog stereo channel signals that are received at input terminals 40 and 42, respectively.

Depending on the particular configuration of the multimode FM transceiver 10, the transceiver 10 is capable of mixing two or more of its input source signals together to generate one or more of the following output signals: an outgoing FM transmission signal to drive an external transmit antenna 60; left channel (called "LOUT") and right channel (called "ROUT") analog stereo signals that appear at output terminals 52 and 50, respectively; and a digital output signal (called "DOUT") that is routed through the digital audio interface 16. In accordance with some embodiments of the invention, the multimode FM transceiver 10 may also provide a low impedance RF transmission output signal (called "TXB") at an output terminal 64 for purposes of driving a low impedance load.

As described herein, the multimode FM transceiver 10 reuses some of its hardware components for purposes of reducing the complexity and size of the transceiver 10, as well as reducing the overall time that may be consumed designing the transceiver 10. For example, in accordance with some embodiments of the invention, a digital signal processor (DSP) 20 of the multimode FM transceiver 10 performs both digital FM modulation (for the FM transmit mode) and digital FM demodulation (for the FM receive mode) for the transceiver 10. As another example of the hardware reuse, analog-to-digital converters (ADCs) 24 and 26 of the multimode FM transceiver 10 perform transformations between the analog and digital domains for both complex (when the transceiver 10 is in the FM receive mode) and real (when the transceiver 10 is in the FM transmit mode) signals. Additionally, the ADCs 24 and 26 may be used in the audio mode for purposes of digitizing the LIN and RIN stereo channel signals.

As another example of hardware reuse by the multimode FM transceiver 10, in accordance with some embodiments of the invention, digital-to-analog converters (DACs) 32 and 36 of the transceiver 10 convert digital audio band signals from the digital to the analog domain for both the FM receive and audio modes. The DACs 32 and 36 are also used during the FM transmit mode for purposes of converting intermediate frequency (IF) band signals from the digital to the analog domain.

Turning now to the overall topology of the multimode FM transceiver 10, the transceiver 10 includes a multiplexer 100 for purposes of routing the appropriate analog signals to the ADCs 24 and 26 for conversion. For example, the multiplexer 100 may select an incoming analog IF signal during the FM receive mode and select the LIN and RIN stereo channel signals during the FM transmit and audio modes. The digital signals that are provided by the ADCs 24 and 26 are routed to the DSP 20.

For the FM receive mode, the multimode FM transceiver 10 includes analog mixers 90 that are coupled to a tunable local oscillator 92, the frequency of which selects the desired FM channel to which the transceiver 10 is tuned. In response to the incoming RF FM signal, the mixers 90 produce corresponding analog IF, FM quadrature signals that pass through programmable gain amplifiers (PGAs) 94 before being routed to the ADCs 24 and 26. Thus, the ADCs 24 and 26 convert the analog IF quadrature signals from the PGAs 94 into digital signals, which are provided to the DSP 20. The DSP 20 demodulates the received complex signal to provide corresponding digital left and right channel stereo signals at its output terminals; and these digital stereo signals are converted into the analog counterparts by the DACs 32 and 36, respectively. As described further below, mixing may then be performed by mixers, or analog adders 54, which provide the ROUT and LOUT stereo signals at the output terminals 50 and 52, respectively. It is noted that the digital demodulated stereo signals may also be routed from the DSP 20 to the digital audio interface 16 to produce the DOUT digital signal.

In the FM transmit mode of the multimode FM transceiver 10, the content to be transmitted over the FM channel (selected by the frequency of the local oscillator 92, for example) may originate with the DIN digital data signal, the LIN and RIN stereo channel signals or a combination of these signals. Thus, depending on whether the analog signals communicate some or all of the transmitted content, the multimode FM transceiver 10 may use the ADCs 24 and 26. The DSP 20 performs FM modulation on the content to be transmitted over the FM channel to produce digital orthogonal FM signals, which are provided to the DACs 32 and 36 to produce corresponding analog orthogonal FM signals, which are in the IF range. Analog mixers 68 (which mix the analog orthogonal FM signals with a frequency that is selected by the local oscillator 92) of the multimode FM transceiver 10 frequency translate and combine the signals to produce an RF FM signal that is provided to the transmit antenna 60.

In the audio mode of the multimode FM transceiver 10, the DSP 20 may be used to perform digital mixing. Analog mixing in the audio mode may be performed using the adder 54, as further described below.

Among the other features of the multimode FM transceiver 10, in accordance with some embodiments of the invention, the transceiver 10 includes a control interface 38 for purposes of receiving various signals 39 that control the mode (FM transmit, FM receive or audio) in which the transceiver 10 is operating, as well as the specific submode configuration for the mode, as further described below. In accordance with some embodiments of the invention, the multimode FM transceiver 10 may also include a microcontroller unit (MCU) 110 that coordinates the general operations of the transceiver 10, such as configuring the ADCs 24 and 26 and DACs 32 and 36, configuring data flow through the multiplexer 100, etc., as further described below.

Figure 2:
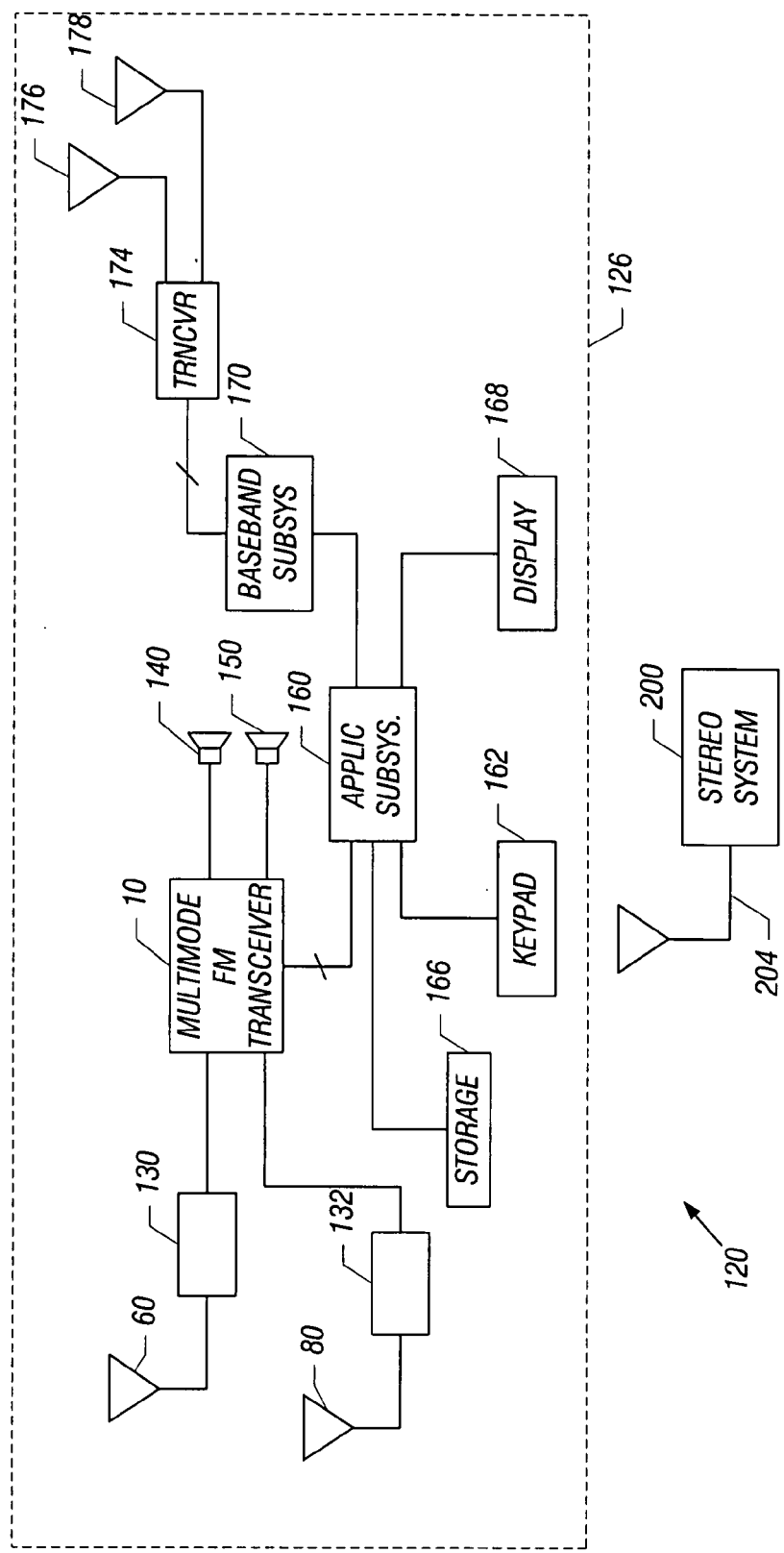
FIG. 2 is a schematic diagram of a wireless system according to an embodiment of the invention.

Referring to FIG. 2, in accordance with some embodiments of the invention, the multimode FM transceiver 10 may be part of a multimedia portable wireless device 126, which, in turn, is part of a wireless system 120. As examples, the wireless device 126 may be a dedicated MP3 player; a cellular telephone or personal digital assistant (PDA) with the capability of playing music downloads; part of a wireless link between a satellite antenna and an FM receiver; etc.

Among its other various functions, the wireless device 126 may store digital songs on storage 166, which may be a flash memory or hard disk drive, as just a few examples. The wireless device 126 generally includes an application subsystem 160 that may, for example, receive input from a keypad 162 of the wireless device 126 and display information on a display 168. Furthermore, the application subsystem 160 may generally control the retrieval and storage of songs from the storage 166 and the communication of the songs (via the DIN data signal (see FIG. 1), for example) with the multimode FM transceiver 10. As shown, the multimode FM transceiver 10 may be directly connected to relatively low power left channel 140 and right channel 150 speakers for purposes of playing a stored song, a mixed version of the song or other sounds, as further described below. As depicted in FIG. 2, the multimode FM transceiver 10 may be coupled by a matching network 130 to the receive antenna 60 and may be coupled by a matching network 132 to the transmit antenna 80.

Although the wireless device 126 may include the speakers 140 and 150, it may be desirable to play sounds that are generated by the wireless device 126 over a more sophisticated speaker system. Therefore, in accordance with some embodiments of the invention, the wireless device 126, via the multimode FM transceiver 10, may broadcast content to be played over an FM channel to the receiver of an adjacent stereo system 200 (as an example). As shown, the stereo system 200 includes an RF antenna 204 for purposes of receiving the transmitted content from the wireless device 126.

In accordance with some embodiments of the invention, the wireless device 126 may have the ability to communicate over a communications network, such as a cellular network. For these embodiments of the invention, the wireless device 126 may include a baseband subsystem 170 that is coupled to the application subsystem 160 for purposes of encoding and decoding baseband signals for this wireless network. A baseband subsystem 170 may be coupled to a transceiver 174 that is connected to corresponding transmit 176 and receive 178 antennas. For these embodiments of the invention, the multimode FM transceiver 10 may be used to mix in audio content for purposes of indicating operation of the baseband subsystem 170. For example, in accordance with some embodiments of the invention, in response to an incoming phone call, the multimode FM transceiver 10 may mix an audible ring signal that lets a listener of the wireless device 126 be aware that an incoming call is being received. Other embodiments are possible and are within the scope of the appended claims.

Figure 3:
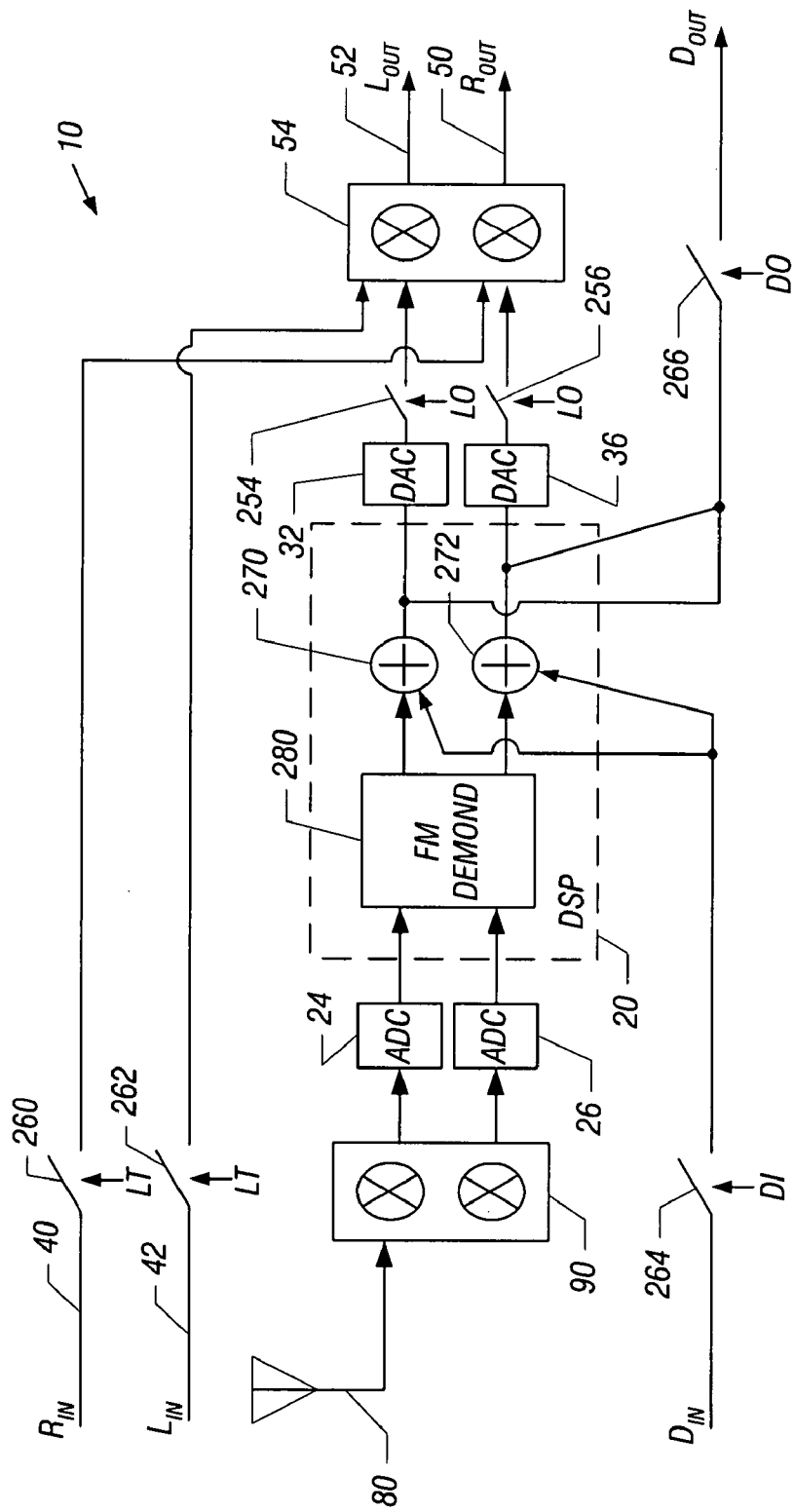
FIG. 3 is a schematic diagram of the multimode FM transceiver illustrating operation of the transceiver when in an FM receive mode according to an embodiment of the invention.

In accordance with some embodiments of the invention, when in the FM receive mode, the multimode FM transceiver 10 may establish the general signal flow that is depicted in FIG. 3. The various functions (i.e., submodes of the FM receive mode) that may be provided by the multimode FM transceiver 10 during the FM receive mode are controlled, in general, by four bits that may be written via the control interface 38 (see FIG. 1): a bit (called "DI"), which controls the enablement of the DIN digital data input signal; a bit (called "DO"), which controls the enablement of the DOUT digital data out signal; a bit (called "LO"), which controls the enablement of the LOUT and ROUT stereo channel signals; and a bit (called "LT") that controls enablement of the RIN and LIN stereo channel input signals. A bit called "RX," which also may be written via the control interface 38, is used to select the FM receive mode.

Conceptually, the DI signal generally controls the state of a switch 264, which controls communication of the DIN signal with the DSP 20. The DO signal generally controls a switch 266 that controls communication of the DOUT signal from the DSP 20. The LO signal controls two switches 254 and 256: the switch 254 controls communication between the output terminal of the DAC 32 and the mixer 54; and the switch 256 controls communication between the output terminal of the DAC 36 and the mixer 54. The LT signal controls the states of two switches 260 and 262: the LT signal controls the state of a switch 260, which is coupled between the RIN right stereo channel signal input terminal 40 and the mixer 54; and the LT signal also controls the state of a switch 262, which is coupled between the LIN stereo channel input signal terminal 42 and the mixer 54.

The combination of the LT, LO, DO and DI signals provide up to sixteen possible submodes for the FM receive mode, as depicted in the chart of FIG. 4. Some of these submodes, however, may not be used and as such are indicated as being "invalid" in FIG. 4. For example, for submode one (an "invalid mode") that is depicted in FIG. 4, all of the LT, LO, DO and DI bits are de-asserted to disable all of the input and output signals to and from the multimode FM transceiver 10.

As examples of the possible submodes for the FM receive mode, the LT signal may be asserted (a logic one bit, for example) to couple the RIN and LIN stereo channel signals to the analog mixer 54. If the LO signal is also asserted (a logic one bit, for example), then the RIN and LIN stereo channel signals may be mixed with the received content from a selected FM channel. If the LT signal is asserted and the LO signal is, however, de-asserted (a logic zero bit, for example), then a microphone (connected to the terminals 40 and 42) may be used to play a user's voice directly over the output speakers 140 and 150 (see FIG. 2, for example) of the wireless device 126. As another example, if the DI signal is asserted, then the multimode FM transceiver 10 may be used for purposes of digital mixing in which the DIN digital input signal may be mixed with the content received from the FM channel. For example, in accordance with some embodiments of the invention, the DI signal may be asserted for purposes of mixing a digital ring tone signal with the received FM content to audibly indicate an incoming phone call. The assertion of the DO signal may be used for purposes of digital recording. Thus, in accordance with some embodiments of the invention, the mixed FM content and DIN digital input signal may be sent to the DOUT digital output signal for purposes of permitting the application subsystem 160 (see FIG. 2) to digitally record the mixed signal. Other variations are possible.

As depicted in FIG. 3, in accordance with some embodiments of the invention, in addition to performing FM demodulation (as depicted by box 280), the DSP 20 may also perform digital mixing, as depicted by the mixers 270 and 272. Thus, the mixer 270 may be used for purposes of mixing for the left stereo channel, and the mixer 272 may be used for purposes of mixing for the right stereo channel. As depicted in FIG. 3, the DOUT digital output signal is derived from the output of the mixers 270 and 272.

Figure 5:
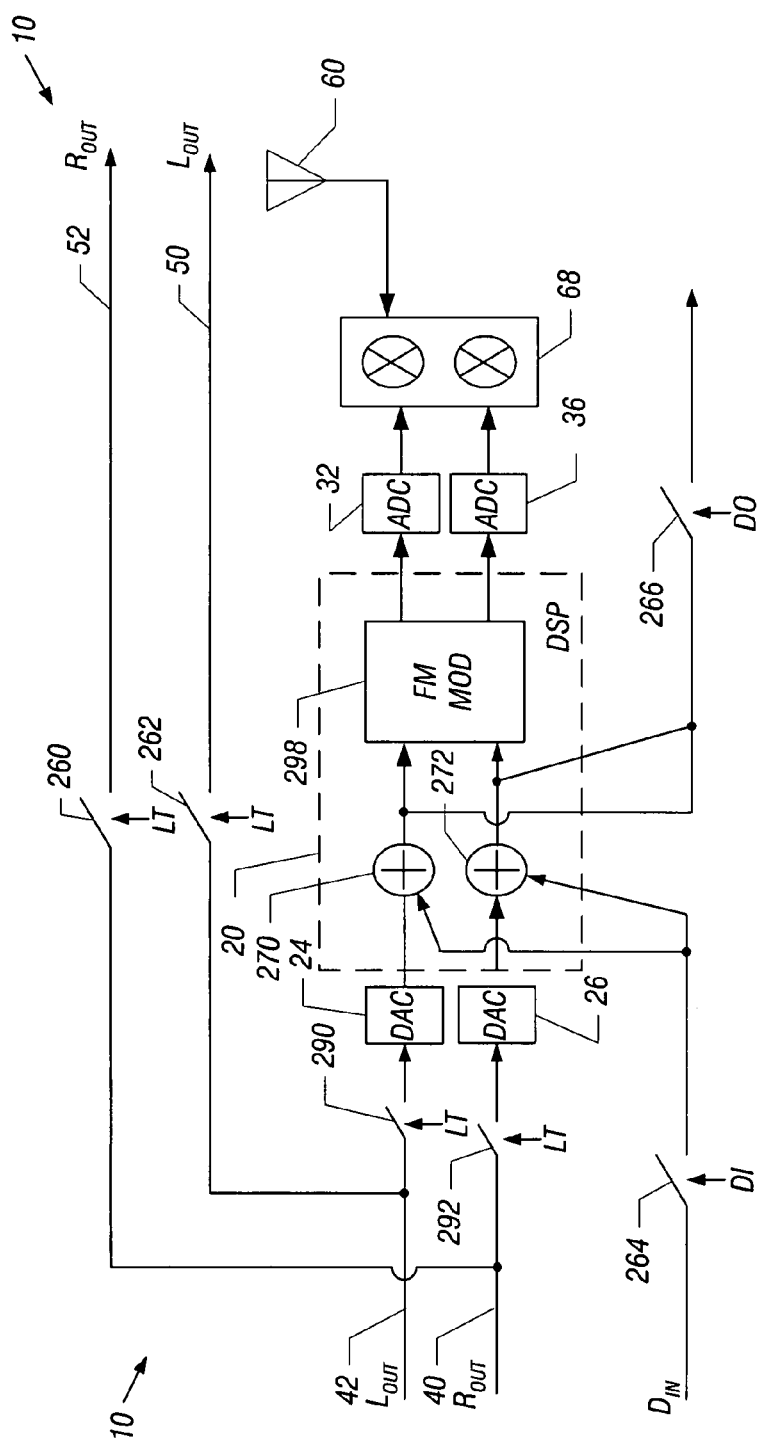
FIG. 5 is a schematic diagram of the multimode FM transceiver illustrating operation of the transceiver when in an FM transmit mode according to an embodiment of the invention.

In accordance with some embodiments of the invention, the multimode FM transceiver 10 has the general signal flow, which is depicted in FIG. 5, for the FM transmit mode. Referring also to FIG. 6 that depicts all of the possible submodes, the particular submode of the FM transmit mode is generally programmed in response to four signals: the LT signal, the DO signal, the DI signal and a signal called "LI." The LI signal, when asserted, enables connection of the LIN left channel stereo input terminal 42 and the RIN right channel stereo input terminal 40 to the ADC 24 and the ADC 26, respectively. Additionally, a signal called "TX" is used to place the multimode FM transceiver 10 in the FM transmit mode.

As depicted in FIG. 6, twelve possible "valid" submodes of the FM transmit mode may be achieved by manipulating the states of the LT, LI, DO and DI signals in accordance with some embodiments of the invention. Referring back to FIGS. 5 and 6, as an example, in accordance with some embodiments of the invention, the LI signal may be asserted to cause the switches 290 and 292 to couple the LIN and RIN stereo channel signals to the ADCs 24 and 26. The ADCs 24 and 26, in turn, provide digitized representations of the LIN and RIN stereo channel signals to the DSP 20. The digital adders 270 and 272 of the DSP 20 digitally mix the digitized LIN and RIN signals with the incoming DIN signal (if the DI signal is asserted) and then performs FM modulation to transmit the mixed content over the FM channel to a nearby stereo system, for example. Thus, the LI signal may be asserted for purposes of transmitting the LIN and RIN signal content out over the selected FM channel. This may be used, for example, for purposes of mixing output signals from a microphone (connected to the terminals 40 and 42) so that audio input from the user may be mixed with a song that is played back (received via the DIN signal) and played over the stereo channels.

As another example, the LIN and RIN stereo channel signals may be used to communicate audio content to be transmitted out over the RF FM channel, while the DIN signal indicates a ring tone to play over the channel. As yet another example, the LI signal may be de-asserted and the DI signal may be asserted to facilitate direct digital transmission by the multimode FM transceiver 10. As yet another example, the DO signal may be asserted for purposes of performing digital recording of the digital signals provided by the mixers 270 and 272. Thus, many combinations are possible in accordance with the many different possible embodiments of the invention.

Figure 7:
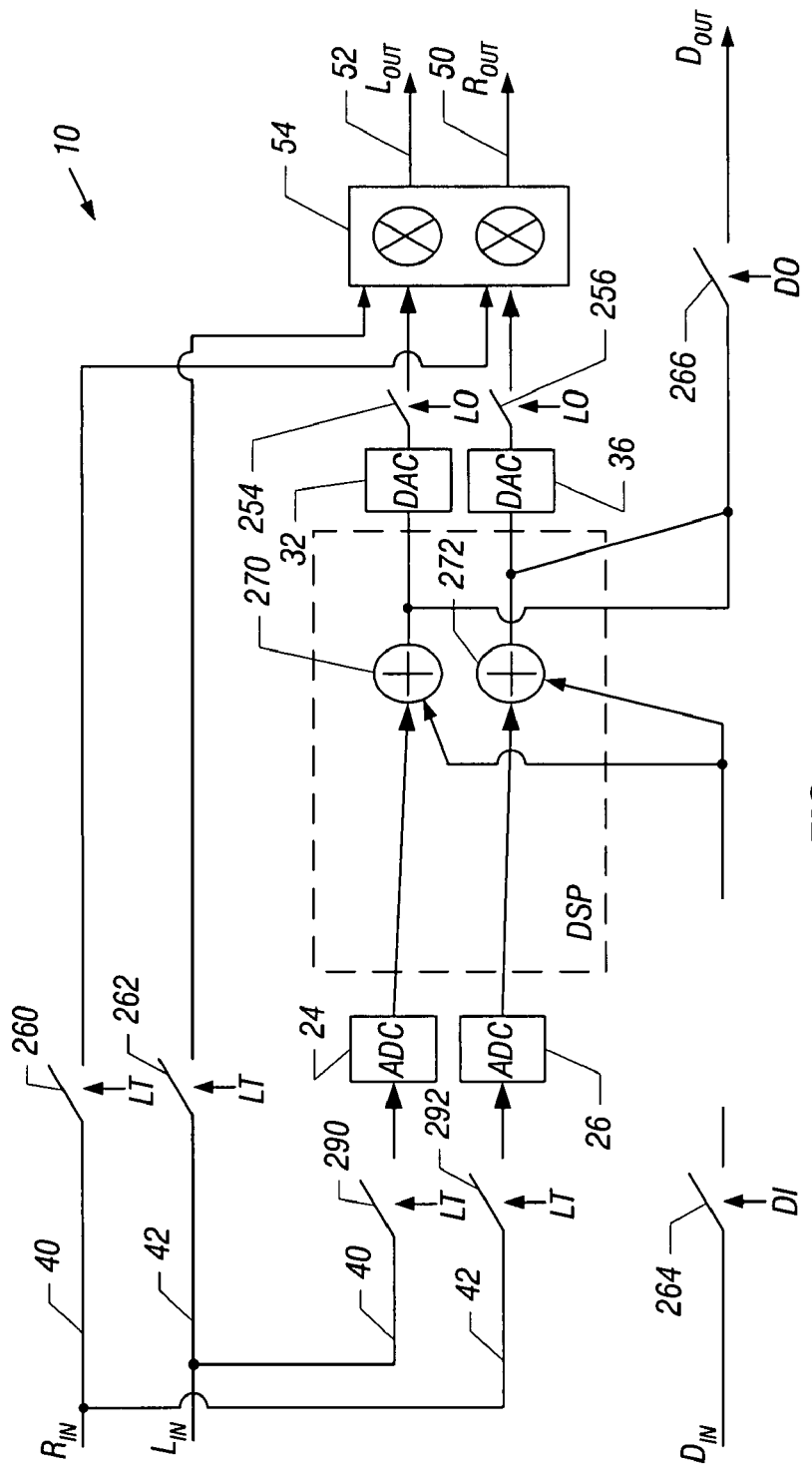
FIG. 7 is a schematic diagram illustrating an audio mode of the multimode FM transceiver according to an embodiment of the invention.

FIG. 7 depicts the general signal flow for the multimode FM transceiver 10 for the audio mode. In the audio mode, the transceiver 10 may perform analog-to-digital conversion, digital-to-analog conversion, line bypass, analog mixing and digital mixing. The submodes for the audio mode are controlled by the LT, LO, LI, DO and DI signals, in accordance with some embodiments of the invention. In particular, thirty-two submodes may be possible in the audio mode, as depicted in FIG. 8, in accordance with some embodiments of the invention. In general, the audio mode may be selected by the TX and RX signals being de-asserted in accordance with some embodiments of the invention.

As an example of the possible submodes, in accordance with some embodiments of the invention, analog-to-digital conversion of the RIN and LIN stereo channel signals may be accomplished by asserting the LI and DO signals. Thus, the DOUT signal for this submode indicates the digitized version of the RIN and LIN stereo channel signals. As another example, digital-to-analog conversion of the DIN signal may be accomplished by asserting the DI and LO signals. In this mode, the DACs 32 and 36 form the LOUT and ROUT signals, which indicate the analog left and right channel signals derived from the DIN digital input signal. Regarding mixing, digital mixing may be accomplished by asserting the DI and LI signals. Thus, the RIN and LIN stereo channel signals are digitized and mixed with the DIN data signal via the mixers 270 and 272. The digital output may then be obtained by asserting the DO signal so that the DOUT signal indicates the digitally mixed signal. Analog mixing may likewise be performed. For example, the DI, LO and LT signals may be asserted so that analog representations of the DIN signal appear at the mixer 54, which mixes the RIN and LIN signals with these analog signals to produce the analog LOUT and ROUT signals. As yet another variation, a line bypass may be performed by asserting the LT signal and de-asserting the LO signal to couple the stereo input terminals 40 and 42 to the stereo output terminals 50 and 52, respectively. Thus, many variations are possible and are within the scope of the appended claims.

Referring back to FIG. 1, in accordance with some embodiments of the invention, the ADC 24, 26 may be a delta sigma modulator (DSM). Due to the reuse of the ADCs 24 and 26 in the different operating modes of the multimode FM transceiver 10, the ADCs 24 and 26 processes either a pair of independent real stereo signals or an interrelated pair of I and Q quadrature signals, depending on the selected mode.

A real signal may be defined as an electrical time-varying physical quantity (of the real world), i.e., a voltage, current or power. The real signal is characterized by a symmetric spectrum for positive and negative frequencies, i.e., the center frequency of its spectrum may be represented by two phasors of the same amplitude rotating at the equal and opposite rotational frequency. A complex, or quadrature signal may be defined as a signal that can be represented by two real signals, the real or in-phase (I) or imaginary or quadrature (Q) parts, such that the center frequency of its spectrum can be represented by a single phasor rotating with positive or negative rotational frequency. If half of the bandwidth is smaller than its center frequency, then the signal spectrum has only positive and negative frequency components. Conversely, there will be a nonsymmetrical spectrum with respect to DC, which extends to DC itself. Based on this definition, the case of a passband spectrum which is not symmetric (i.e., which not extend up to DC), is not considered as a complex signal, but the superimposition of two complex signals. In fact, the center frequencies of the two passband spectrum may be represented by two phasors of different amplitude rotating in opposite directions. This situation happens for instance in presence of mismatches in I and Q paths: the two center frequency components can be represented by two phasors of different amplitude rotating in equal opposite directions. Note also as a real signal itself can be considered as the superimposition of two complex signals.

For a downconverted quadrature (I/Q) low-IF or zero-IF radio signals, the DSM can be operated either in real or complex configuration, as the in-phase (I) and quadrature (Q) real signals represent the real and imaginary parts of the same complex signal. In particular, the complex configuration is particularly advantageous in terms of signal-to-noise ratio (SNR) for low-IF signal, especially if the IF frequency is not that low with respect to the signal bandwidth. Conversely, for stereo audio signal only the real configuration can be used, because the LIN and RIN stereo channel signals are two completely independent real signals.

Although the discussion below considers only discrete time (DT)-based DSM, embodiments of the invention may also include continuous-time DSM (CT-DSM), as a CT-DSM is equivalent to a DT-DSM with an anti-aliasing filter (AAF) front-end.

Figure 9:
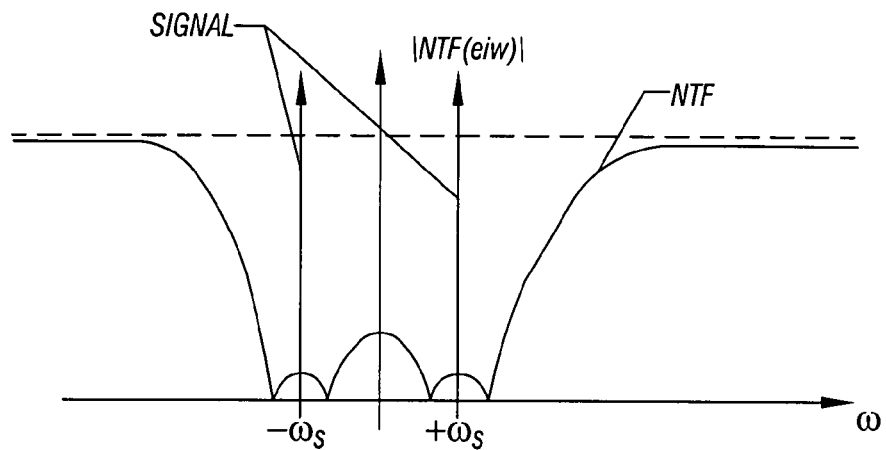
FIG. 9 illustrates a noise transfer function of a real discrete time delta sigma modulator according to an embodiment of the invention.

FIG. 9 shows a possible fourth-order noise-transfer function (NTF) of a real discrete time (DT) DSM, where the zeros have been optimized for the bandwidth of the signal. As shown, the amplitude of the transfer function for a real block is an even function of the frequency, i.e., is symmetric with respect to DC. Also the signal is symmetric with respect to DC. The angular frequency $\omega_s$ represents the center frequency of the signal. This architecture can also be used to process complex signals, with two identical systems: one for I and one for Q. The complex representation of the NTF will be the same while the signal will have only one spectral row, for positive or negative frequency.

Figure 10:
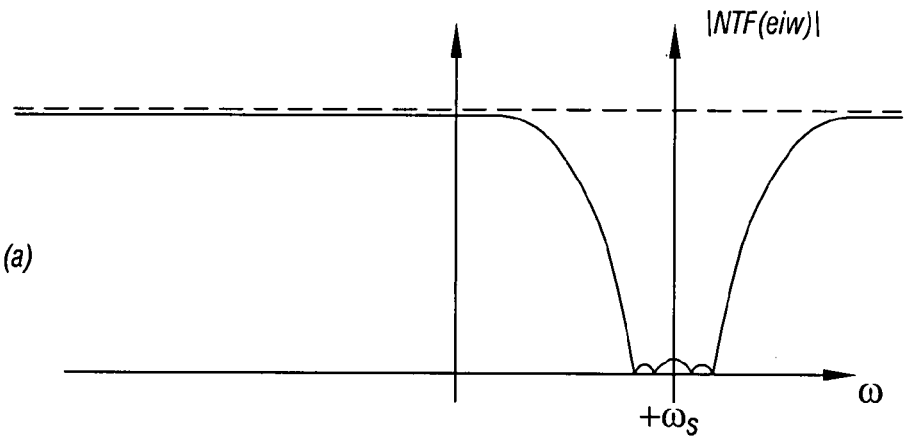
FIG. 10 is a noise transfer function for positive frequencies for a complex discrete time delta sigma modulator according to an embodiment of the invention.
Figure 11:
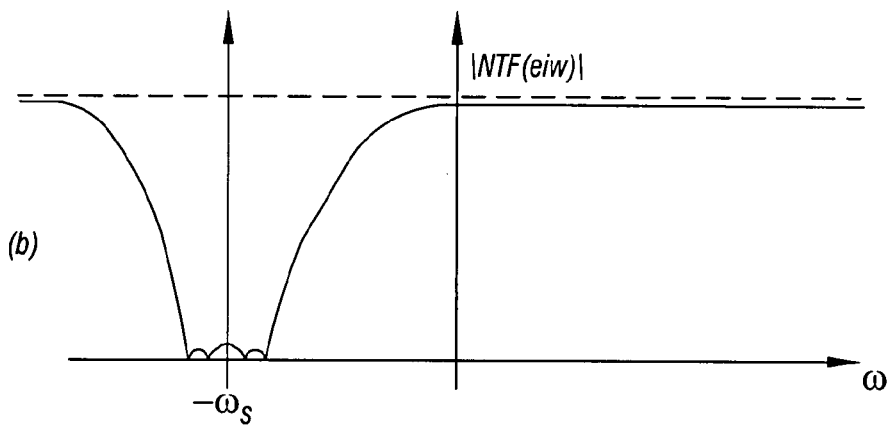
FIG. 11 is a noise transfer function for negative frequencies for a complex discrete time delta sigma modulator according to an embodiment of the invention.

FIGS. 10 and 11 show a possible fourth-order noise-transfer function (NTF) of a complex DSM, where the zeros have been optimized for the bandwidth of the signal. As it can be seen, the function is not symmetric with respect to DC but it is symmetric with respect to the center frequency of the signal bandwidth. In the complex signal case, this allows to place all the four zeros in the BW of interest, and by so doing obtaining, in general, a better SNR.

Figure 12:
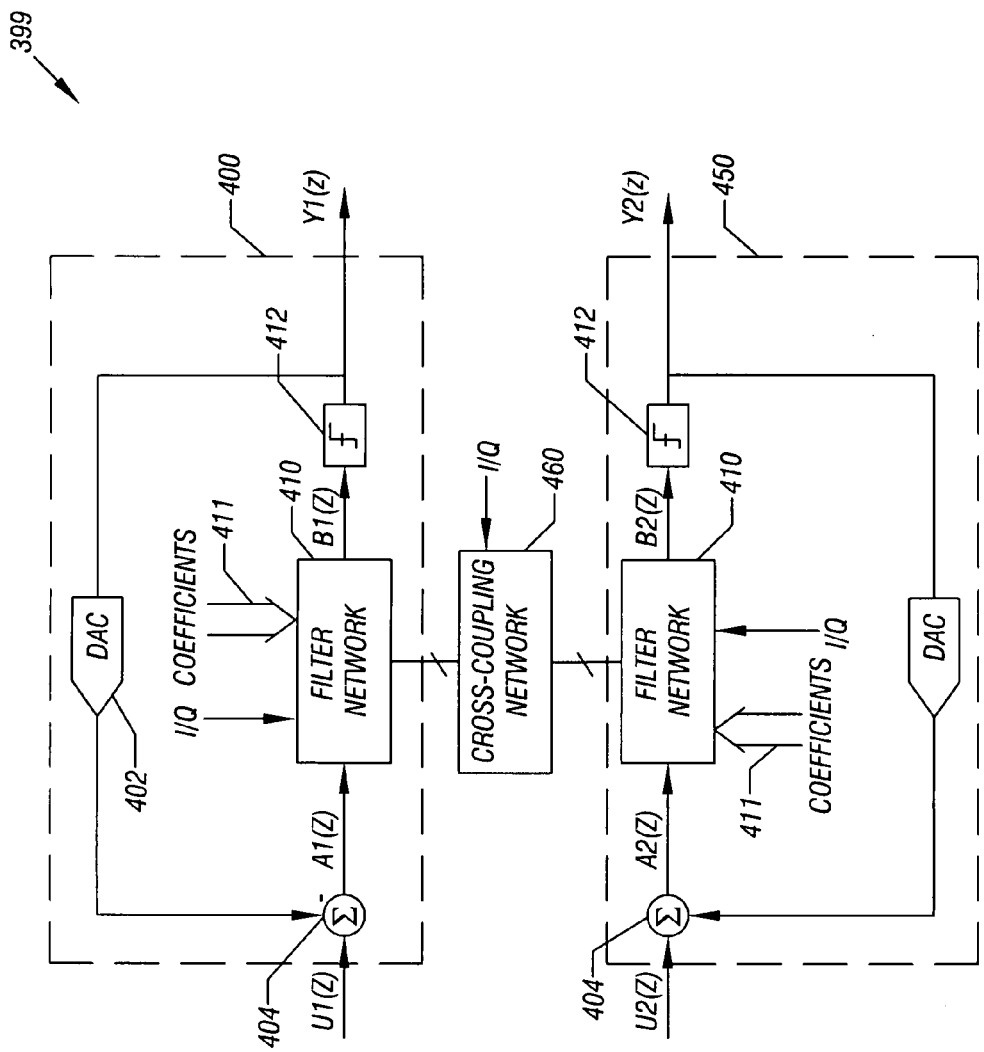
FIG. 12 is a schematic diagram of an analog-to-digital converter architecture according to an embodiment of the invention.

Referring to FIG. 12, in accordance with some embodiments of the invention, the ADCs 24 and 26 may together have a digital-to-analog converter architecture 399. In particular, the architecture may include two delta sigma modulators (DSM) 400 and 450, each of which has a similar design. Each DSM 400, 450 receives an analog signal and converts this analog signal into its digital counterpart. For example, the DSM 400 receives an analog signal (called "U1(z)") and provides a digital signal (called "Y1(z)"). Similarly, the DSM 450 receives an analog signal called "U2(z)" and provides a digital signal called "Y2(z)." As depicted in FIG. 12, a cross-coupling network 460 potentially couples the DSMs 400 and 450 together, depending on whether the ADCs 24 and 26 process independent, real signals or two interrelated signals that represent the I and Q components of a complex signal.

More specifically, when the ADCs 24 and 26 process independent real signals (such as the LIN and RIN stereo channel signals, for example), the cross-coupling network 460 is decoupled from the DSMs 400 and 450 so that the DSMs 400 and 450 are each independent to produce the corresponding digital counterpart signal. However, when the U1(z) and U2(z) signals are quadrature signals (i.e., interrelated real signals that represent the I and Q components of a complex signal), the cross-coupling network 460 couples the DSMs 400 and 450 together to produce the corresponding quadrature digital signals that appear as the Y1(z) and Y2(z) signals. As depicted in FIG. 12, in accordance with some embodiments of the invention, the cross-coupling network 460 receives a signal (called "I/Q"), a signal that may be asserted (for example) to cause the cross-coupling network 460 to effectively "disappear," and de-asserted (for example) to cross-couple the DSMs 400 and 450 to process the quadrature signals.

As depicted in FIG. 12, in accordance with some embodiments of the invention, the DSM 400 includes a summing node 404 that receives an output signal from a DAC 402, which converts the Y1(z) digital output signal into an analog signal. The summing node 404 subtracts the signal that is provided by the DAC 402 from the input signal U1(z). This produces a signal (called "A1(z)") that is provided to a filter network 410 of the DSM 400. The filter network 410, in turn, provides an output signal (called "B1(z)") that is provided to a quantizer 412, which provides the Y1(z) output signal. It is noted that the quantizer 412 performs noise shaping so that the DSP 20 (see FIG. 1) may easily remove noise from the digitized signal. The filter network 410 also receives the I/Q signal and receives indications of coefficients for the filter network 410 via a bus 411. Thus, depending on the state of the I/Q signal, the filter network 410 adapts its structure accordingly. Furthermore, the coefficients that are programmed into the filter network 410 via the bus 411 change according to whether the DSM 400 is processing independent real signals or quadrature signals.

The DSM 450 may have a similar structure to the DSM 400 in accordance with some embodiments of the invention.

Figure 13:
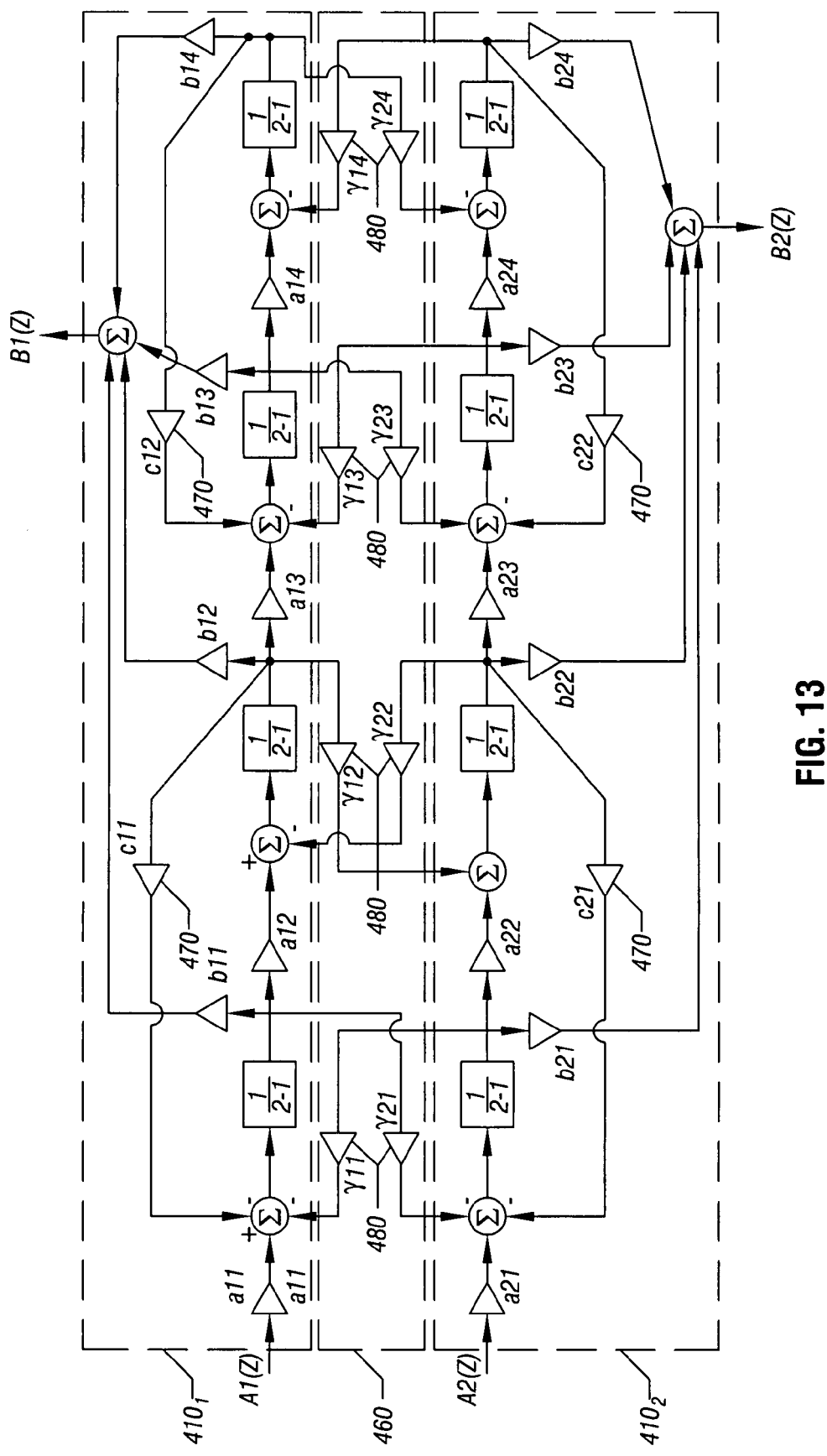
FIG. 13 is a schematic diagram of a loop filter of the analog-to-digital architecture of FIG. 12 according to an embodiment of the invention.

As a more specific example, FIG. 13 depicts, in the Z-domain, a filter $410_1$ (i.e., an embodiment of the filter 410) of the DSM 400, a filter $410_2$ (i.e., an embodiment of the filter 410) of the DSM 450 and the cross-coupling network 460 that is coupled in between. The filter networks $410_1$ and $410_2$ are each a fourth order, real Chebychev-type filter in accordance with some embodiments of the invention. Each filter network $410_1$, $410_2$ includes coefficient gains 470 that are non-zero when the DSMs 400 and 450 are processing independent real signals and are set to zero (to effectively remove the gains) when the DSMs 400 and 450 are processing interrelated quadrature signals of a complex signal. The cross-coupling network 460 also includes gains 480 that are non-zero when the DSMs 400 and 450 are processing the interrelated quadrature signals and are zero when the DSMs 400 and 450 are processing the independent real signals.

Figure 14:
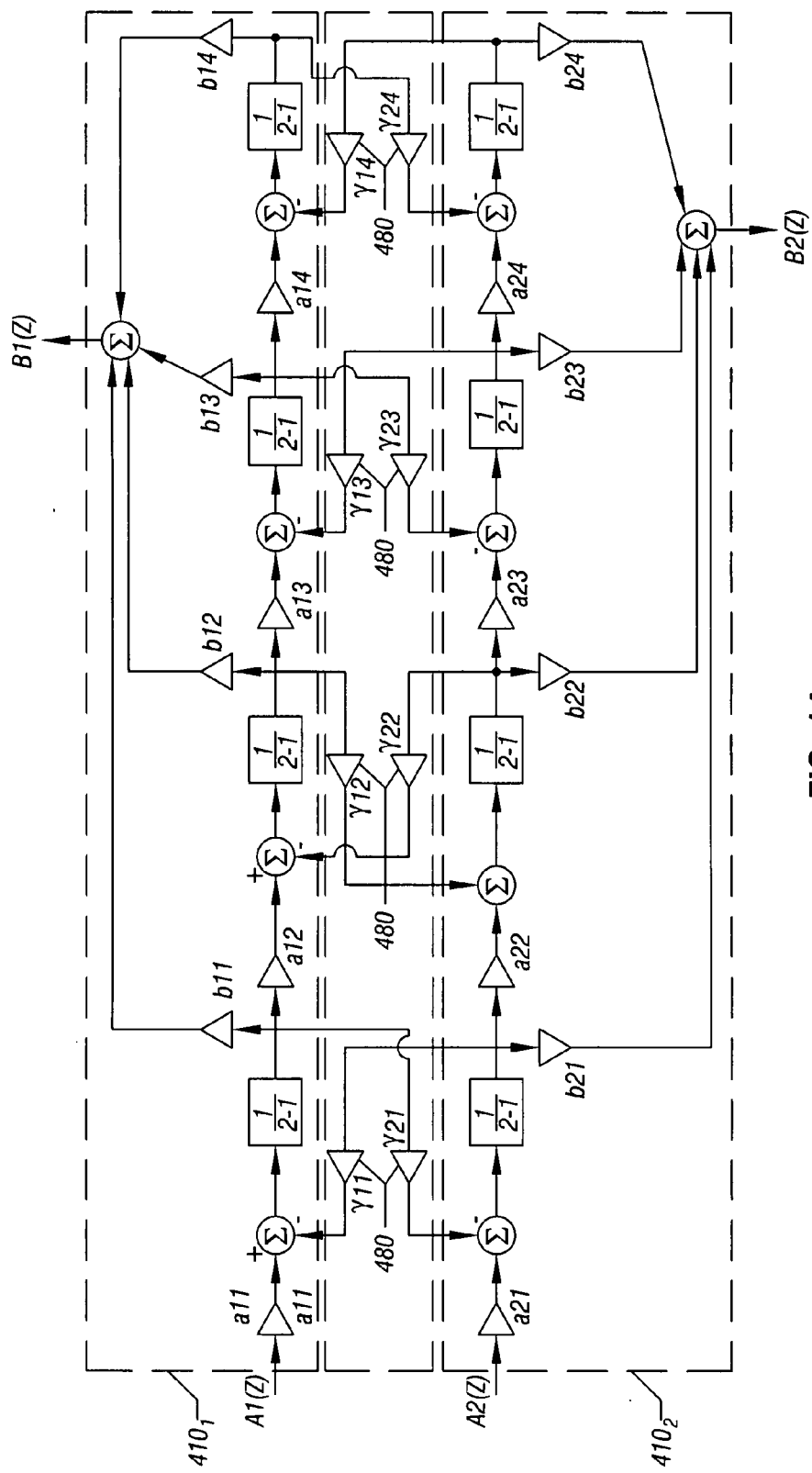
FIG. 14 is a schematic diagram illustrating the loop filter of FIG. 13 when configured to process quadrature signals according to an embodiment of the invention.

Thus, referring also to FIG. 14, for the case when the DSMs 400 and 450 are processing quadrature signals, the gains 470 effectively disappear as depicted in FIG. 14. It is noted that the various remaining gains for the filter networks $410_1$ and $410_2$ are programmed, or adjusted, for processing of the quadrature signals to adjust the zeros and center frequency of the effective loop filter.

In accordance with some embodiments of the invention, the MCU 110 (FIG. 1) may control the generation of the I/Q signal and the programming of the filter coefficients, depending on the mode of the multimode RF transceiver 10.

Figure 15:
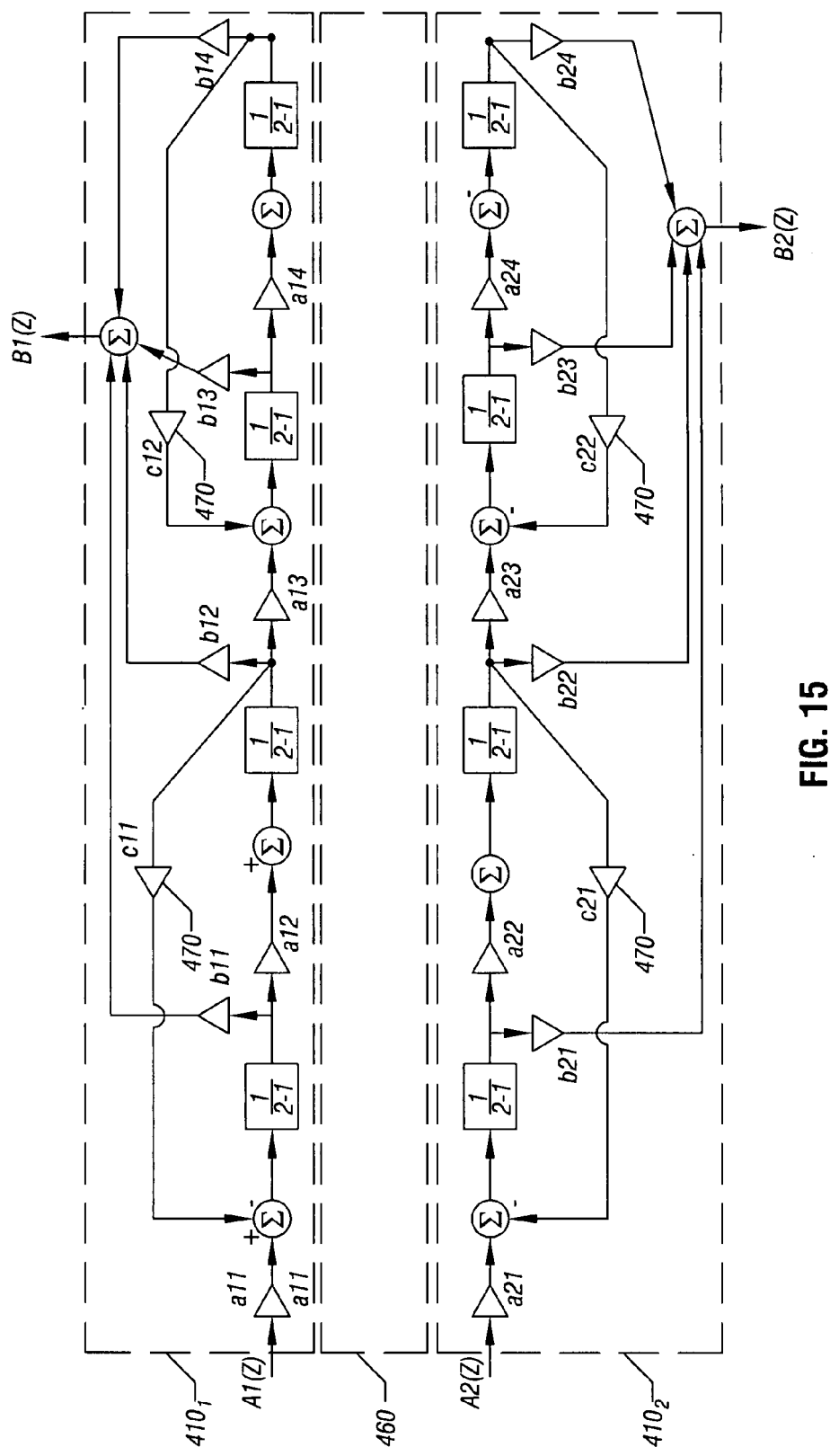
FIG. 15 is a schematic diagram of the loop filter of FIG. 13 when configured to process a real signal according to an embodiment of the invention.

In FIG. 15, which depicts the filter networks $410_1$, $410_2$ and 460 during the DSM's processing of real signals, the gains 480 (see FIG. 13) are zero, and the gains 470 are adjusted for processing the independent real signals. Thus, effectively, the cross-coupling network 460 disappears when the DSMs 400 and 450 are processing independent real signals.

Figure 16:
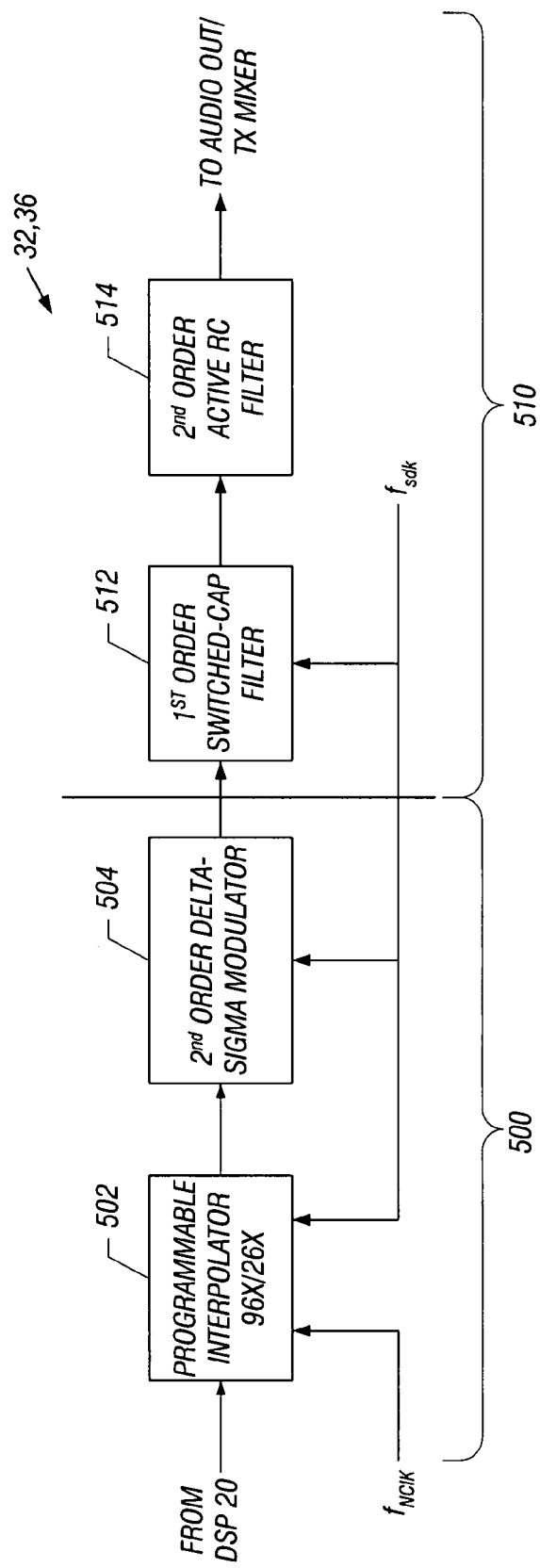
FIG. 16 is a schematic diagram of a digital-to-analog converter of the multimode FM transceiver according to an embodiment of the invention.

Referring to FIG. 16, in accordance with some embodiments of the invention, each DAC 32, 36 may have the following design. The DAC 32, 36 includes a digital side 500 and an analog side 510. The digital side 500 includes a programmable interpolator 502 and second order delta sigma modulator 504. The analog side 510 includes a first order switched capacitor filter 512 and a second order active RF filter 514.

For the FM receive mode of the multimode FM transceiver 10, the signal coming from the DSP has a bandwidth of 16 kHz (as an example), whose Nyquist frequency $f_{Nclk}$ is 32 kHz (as an example). The programmable interpolator 502 interpolates this signal by 96 times (as an example) which means the oversampling ratio is 96 and the oversampling frequency $f_{Sclk}$ is about 3 MHz. This over-sampled signal is then processed by the second order delta sigma modulator 504 to produce a one bit stream.

The above components are implemented in digital hardware. The one-bit stream is the filtered by the first-order switched capacitor filter 512 to remove out of band quantization noise and reconstruct into analog signal. The active RF filter 514 further smoothes the signal. The order of the filters are chosen to minimize area and power. Higher order filters may be used to improve performance. The signal from time active RF filter 514 may be sent to a headphone amplifier to drive a speaker.

For the FM transmit mode of the multimode FM transceiver 10, the signal experiences the same processing procedure. But due to the wider signal bandwidth, $f_{Nclk}$ is now 456 kHz (as an example). The oversampling ratio is 26 times (as an example) and $f_{Sclk}$ is about 12 MHz (as an example). This is possible because the FM transmission SNR requirement is much relaxed than the receiving path. The delta sigma modulator 504 is still second order but is reconfigured to pass a signal centered at 128 kHz with a bandwidth of 200 kHz.

For the receiver modulator, the zero location of the noise transfer function is put at DC, but for the transmitter modulator, the zero position is optimized and is put around 128 kHz. The bandwidth of the switched cap active filter 512 may be changed to accommodate the signal by switching off part of the integration capacitor. The bandwidth of the active RF filter 514 is also programmed accordingly.

Systems and methods are disclosed for efficiently integrating an audio processor (CODEC—coder/decoder) within the same integrated circuit as an FM receiver, an AM receiver, an FM transmitter or any combination of the three. As described herein, therefore, the audio CODEC can be integrated with an FM receiver, an AM receiver, an FM transmitter, an AM/FM receiver, an FM receiver/FM transmitter, an AM receiver/FM transmitter, or an AM/FM receiver/FM transmitter. In addition, a headphone driver and/or a speaker driver can also be integrated within the same integrated circuit. Advantageously, circuit blocks within the integrated circuit may be reused in different modes of operation in order to reduce size requirements for the integrated circuit, as further described below.

Figure 17:
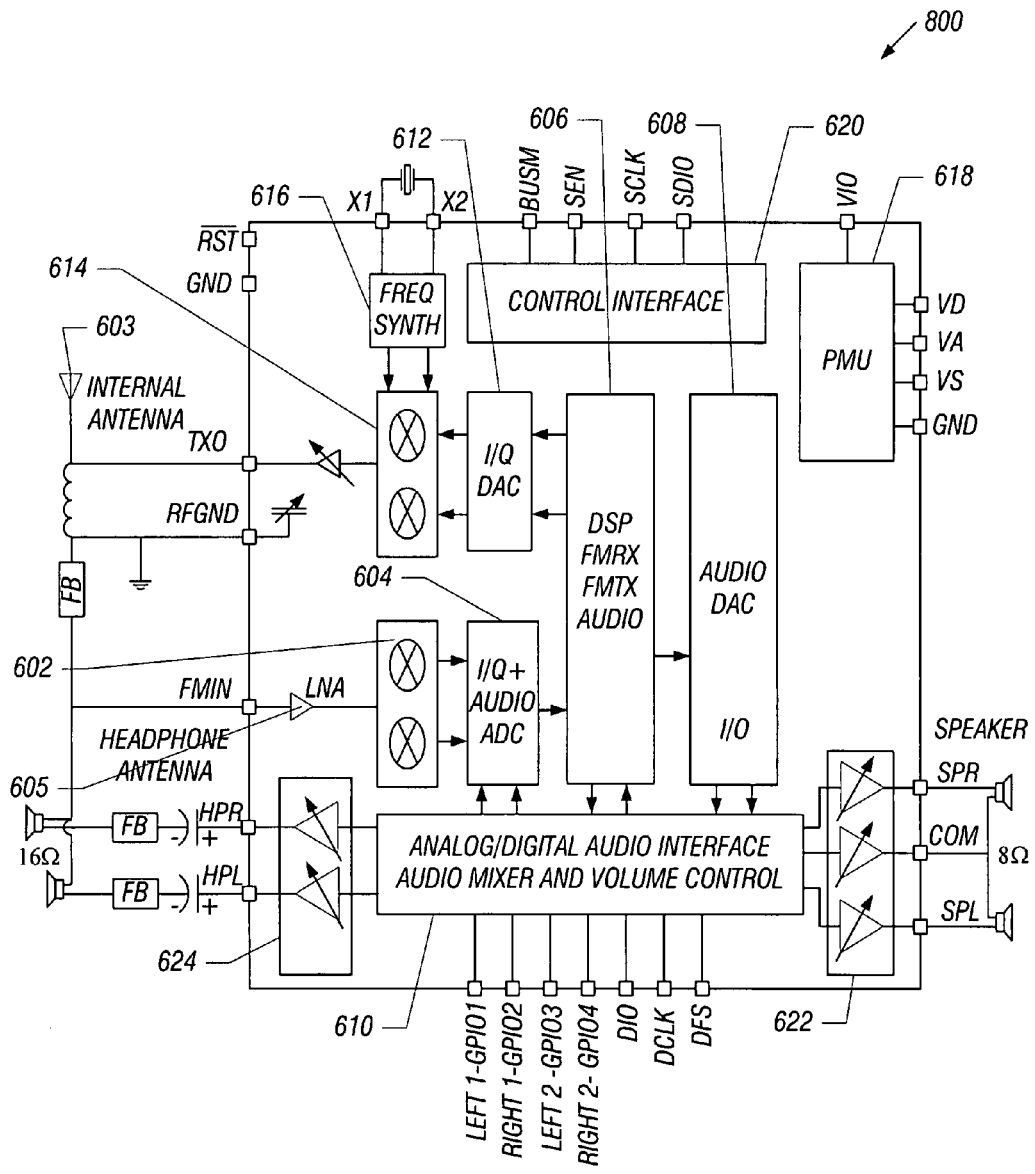
FIGS. 17, 18 and 19 are block diagrams of an integrated circuit including an FM receiver, an FM transmitter, an audio CODEC, a headphone driver and a speaker driver according to different embodiments of the invention.

FIG. 17 is a block diagram of an embodiment for an integrated circuit 600 including an FM receiver, an FM transmitter, an audio CODEC, a headphone driver and a speaker driver. It is noted that other architectures could also be utilized, and as indicated above, different sets of modes of operation could also be provided for the integrated circuit 100, as desired.

Integrated circuit 600 can be, for example, a CMOS integrated circuit. In the example embodiment depicted, the integrated circuit 600 has the input/output pins as set forth in the following table.

TABLE A

I/O PIN DESCRIPTIONS - FM RECEIVER/FM TRANSMITTER

| Pin | Description | Pin | Description |
|---|---|---|---|
| RST_ | Reset (asserted low) | GPIO4 | General purpose I/O |
| GND | Ground | VIO | I/O interface voltage |
| TXO | FM transmit out | VD | Digital supply voltage |
| RFGND | RF ground | VA | Analog supply voltage |
| FMIN | FM input | VS | Speaker driver supply voltage |
| HPR | Headphone output right | GND | Ground |
| HPL | Headphone output left | SPR | Speaker output right |
| BUSM | Bus master | COM | Speaker common node |
| SEN_ | Serial interface enable | SPL | Speaker output left |
| SCLK | Serial clock | DFS | Digital interface sync |
| SDIO | Serial data input/output | DCLK | Digital clock |
| GPIO1 | General purpose I/O | DIO | Digital input/output |
| GPIO2 | General purpose I/O | X1 | Reference clock |
| GPIO3 | General purpose I/O | X2 | Reference clock |

As also depicted, an antenna 603 is coupled to the TXO pin. This antenna 603 can be implemented in a variety of ways depending upon the application. It is noted that internal to the integrated circuit 600, the signal from the TXO pin can be rerouted to the LNA 605 for receive operations. For example, in a cell phone implementation, a small antenna that is internal to the cell phone device could be provided for limited receive and transmit. In addition, an external antenna could be provided for receive, as well. If desired, on-chip variable capacitance circuitry can also be utilized to help tune the antenna for FM transmit operation and/or receiver operation.

Headphones with left and right speakers can be coupled to the HPR and HPL pins through respective capacitors. Other configurations could also be implemented without the capacitors, such as a configuration that provides for a common mode voltage for the headphone common signal. The headphones can also act as an FM antenna for the system. Left and right speakers can be coupled to the SPR, SPL and COM pins. Other configurations could also be implemented, such as configurations where only two output signals are used in combination with capacitors such as is shown for the headphones. It is noted that the FB symbol in FIG. 17 represents a ferrite bead that can be included to help prevent the receive RF energy from going into the headphone section of the integrated circuit.

For FM receiver (FM RX) operation, an FM signal is received at the FM input pin (FMIN) and passed through a low noise amplifier (LNA) 605. A mixer 602 then receives the FM signal and mixes it down to a desired frequency. The signal is then digitized to produce I and Q path signals using ADC 604. The digitized FM signal is then processed with the DSP 606. Digital audio signals are provided to the audio DAC (digital-to-analog converter) 608 and to interface and control interface 610. Analog audio signals are provided to the interface and control interface 610 from the DAC 608. The interface and control block 610 provides an analog and digital audio interface, an audio mixer and volume control. In particular, the interface 610 takes the analog inputs to the ADC 604, and it takes the digital audio inputs straight into the DSP 606. The interface 610 also takes the analog out of the DAC 608, and sends it (through volume controls) to the outputs, the speaker and headphone amps as shown in FIG. 17. So, aside from the digital interface, the interface 610 is essentially an analog signal routing block, as the interface 610 takes in the analog to the ADC 604, and takes analog from the DAC 608 and sends to the outputs. It is noted that the FM receive path can utilize a digital low-IF architecture in mixing the received signals. It is also noted that the digital signal processing and other control can be implemented, at least in part, through the use of an on-chip software programmable microcontroller (MCU).

For FM transmit (FM TX) operation, digital audio signals are provided to the DSP 606. The DSP 606 processes the signals and outputs them as I and Q signals to DAC 612, which may be a single bit or multiple bit architecture. The DAC 612 provides analog output signals to the mixer 614. The mixer 614 outputs an FM signal to the TXO pin through a variable gain amplifier. It is noted that the FM transmit can also be a low-IF architecture. Analog input may also be used into the interface 610, into the ADC 604 and then as described in this paragraph.

For both the FM receiver and FM transmit operations, a frequency synthesizer 616 is utilized to generate desired mixing signals for the mixer 602 and the mixer 614. The frequency synthesizer receives a reference signal at pins X1 and X2, for example, from a crystal oscillator. In addition, a control interface 620 is provided through which external control of the integrated circuit 600 is provided. A power management unit (PMU) 618 is also included within the integrated circuit.

For audio reproduction, the audio DAC 608 produces analog audio signals. The interface and control block 610 is used for controlling the audio interface. This block 610 also includes controls for an audio mixer and volume control. The headphone pins HPR and HPL are driven by headphone driver 624, which includes a pair of variable gain headphone drivers. The speaker pins SPR, SPL and COM are driven using speaker driver 622, which includes two variable gain speaker drivers (for the SPR and SPL pins) and one common mode speaker driver (for the COM pin). It is again noted that the use of capacitors helps eliminate the need for the COM pin, and the use of a COM pin helps eliminate the need for capacitors. Either configuration and/or other configurations can be used as desired.

Advantageously, the circuit blocks within the integrated circuit 600 are re-used for different modes of operation for the integrated circuit 600. For example, the ADC 604 is used to generate digital I and Q path signals for the FM receiver mode of operation, and the ADC 604 is also used for digitizing analog audio signals for the FM transmit mode of operation. The DSP 606 is used to digitally process receive signals in FM receiver mode, to digitally process transmit signals in FM transmit mode, and to process audio signals for the CODEC audio processing. Circuit blocks can also be re-used if AM reception is added to the receive path, as described with respect to FIG. 2 below. In addition, the frequency synthesizer 616 may also in effect re-used to create the clocking signals for the audio portion (ADC, DAC, headphone (and/or speaker) amplifier if a class D-type circuit). In short, the re-use of circuit blocks provides a significant advantage for generating a reduced cost, reduced size integrated circuit. In other embodiments of the invention, the DAC 612 may be re-used (in place of the DAC 608) in the audio reproduction mode. Thus, many variations are contemplated and are within the scope of the appended claims.

Figure 18:
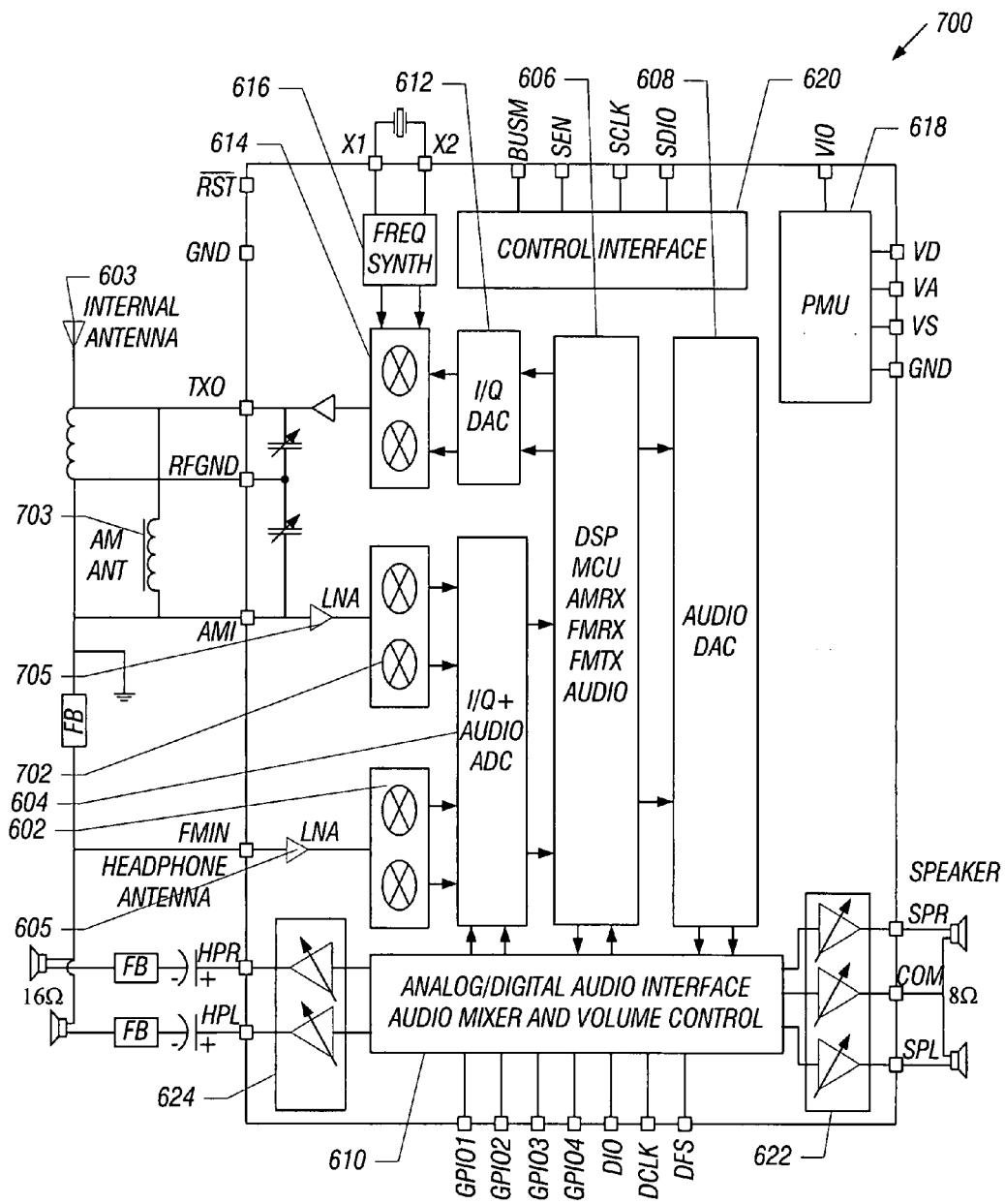

FIG. 18 is a block diagram of an embodiment for an integrated circuit 700 including an AM receiver in addition to an FM receiver, an FM transmitter, an audio CODEC, a headphone driver and a speaker driver, as described with respect to the example embodiment of FIG. 17. It is noted that other architectures could also be utilized, and as indicated above, different sets of modes of operation could also be provided for the integrated circuit 700, as desired.

Integrated circuit 700 can be, for example, a CMOS integrated circuit. As depicted, the integrated circuit 700 has the input/output pins as set forth in the following table.

TABLE B

I/O PIN DESCRIPTIONS - AM/FM RECEIVER/FM TRANSMITTER

| Pin | Description | Pin | Description |
| --- | --- | --- | --- |
| RST_ | Reset (asserted low) | GPIO4 | General purpose I/O |
| GND | Ground | VIO | I/O interface voltage |
| TXO | FM transmit out | VD | Digital supply voltage |
| RFGND | RF ground | VA | Analog supply voltage |
| FMIN | FM input | VS | Speaker driver supply voltage |
| HPR | Headphone output right | GND | Ground |
| HPL | Headphone output left | SPR | Speaker output right |
| BUSM | Bus master | COM | Speaker common node |
| SEN_ | Serial interface enable | SPL | Speaker output left |
| SCLK | Serial clock | DFS | Digital interface sync |
| SDIO | Serial data input/output | DCLK | Digital clock |
| GPIO1 | General purpose I/O | DIO | Digital input/output |
| GPIO2 | General purpose I/O | X1 | Reference clock |
| GPIO3 | General purpose I/O | X2 | Reference clock |
| AMI | AM input | | |

The integrated circuit embodiment 700 in FIG. 18 has similar FM transmit and FM receive functionality and circuitry as described above with respect to the integrated circuit embodiment 600 of FIG. 17. In addition, the integrated circuit 700 includes AM receiver circuitry.

As depicted, an AM antenna 703, such as a loop antenna, can be coupled between RFGND and an AMI input pin. It is also noted that a ferrite bar antenna could be used for AM reception. This ferrite bar antenna for AM reception can be implemented as a long multi-turn loop of wire around a pencil shaped rod. One side can be grounded, while the other side is resonated with on-chip tuning capacitors to help maximize the voltage. A centertap of the ferrite bar can be used to get a signal into the LNA 605. Many arrangements (with and without the centertap) can also be implemented. In addition, as depicted, the on-chip tuning capacitors can be implemented using a variable capacitance circuit coupled between the RFGND and AMI pins within the integrated circuit 700.

In operation, the AM signal is received by the AM antenna 703 and provided to the AMI pin. The AM signal is then passed through a low noise amplifier (LNA) 705. A mixer 702 then receives the AM signal and mixes it down to a desired frequency. The mixer 702 receives mixing signals from frequency synthesizer 616.

As with the FM signal, the AM signal is then digitized to produce I and Q path signals using ADC 604. The digitized AM signal is then processed with the DSP 606. Digital audio signals are provided to the audio DAC (digital-to-analog converter) 108 and to interface and control interface 610. Analog audio signals are provided to the interface and control interface 610 from the DAC 608. As above, the interface 610 provides an analog and digital audio interface, an audio mixer and volume control. It is noted that the AM receive path can utilize a digital low-IF architecture in mixing the received signals. It is also noted that the digital signal processing and other control can be implemented, at least in part, through the use of an on-chip software programmable microcontroller (MCU), as indicated in FIG. 2 with respect to the MCU label included with DSP 606.

As above, the circuit blocks within the integrated circuit 700 are advantageously re-used for different modes of operation for the integrated circuit 700. For example, the ADC 604 is used to generate digital I and Q path signals for the FM receiver mode of operation, to generate digital I and Q path signals for the AM receiver mode of operation, and to digitize analog audio signals for the FM transmit mode of operation. The DSP 606 is used to digitally process receive signals in FM receiver mode, to digitally process receive signals an AM receiver mode, to digitally process transmit signals in FM transmit mode, and to process audio signals for the CODEC audio processing. In addition, the frequency synthesizer is in effect re-used in order to create the clocking signals for the audio portion (ADC, DAC, headphone amplifier if a class D type circuit) in addition to being used for generating mixing signals for mixers 602, 614 and 702. In this regard, a class D-type amplifier typically has a relatively large amount of the associated noise. For purposes of minimizing interference between operation of the class D-type amplifier and an FM/AM receiver, in accordance with some embodiments o the invention, the use of the same frequency synthesizer may be used for purposes of reducing the interference. For example, the current tuned frequency in the FM or AM receiver is used as a measure for purposes of determining at which frequency to operate the class D-type amplifier. As another example, the currently tuned frequency of the AM/FM receiver may be used for purpose of determining how to filter the class D-type amplifier's output. Thus, many variations are possible and are within the scope of the appended claims. In short, the re-use of circuit blocks provides a significant advantage for generating a reduced cost, reduced size integrated circuit.

Similar to the integrated circuit 600 of FIG. 17, in other embodiments of the invention, the DAC 612 may be re-used (in place of the DAC 608) in the audio reproduction mode. It is noted that previous patent applications assigned to the same assignee as this current application—Silicon Laboratories Inc.—describe embodiments that the re-use circuit blocks for different modes of operation with an integrated circuit. For example, re-use of circuit blocks within an integrated circuit having an FM receiver mode of operation and an FM transmit mode of operation are described in U.S. patent application Ser. No. 11/396,097, filed Mar. 31, 2006, and entitled "TRANSCEIVER HAVING MULTIPLE SIGNAL PRO- CESSING MODES OF OPERATION," which is hereby incorporated by reference in its entirety. Re-use of circuit blocks within an integrated circuit having an FM receiver mode of operation and an AM receiver mode of operation are described in U.S. patent application Ser. No. 10/881,926, filed Jun. 30, 2004, and entitled "INTEGRATED LOW-IF TERRESTRIAL AUDIO BROADCAST RECEIVER AND ASSOCIATED METHOD," which is hereby incorporated by reference in its entirety.

Looking back to FIG. 17, the stereo audio CODEC processing provides high-quality audio for two stereo channel inputs with optional differential inputs (the GPIO inputs, for example) and a microphone input. For example, in some embodiments of the invention, the GPIO 1 input terminal may be the left 1 channel, the GPIO 2 terminal may be the right 1 channel, the GPIO 3 terminal may be the left 2 channel, and the GPIO 4 terminal may be the right 2 channel. Channel assignments may be changed in accordance with other embodiments of the invention. The integrated digital core provides stereo audio enhancements for either analog or digital audio inputs with audio equalization, multiple input mixing, noise cancellation, and automatic level control (ALC) and limiting on each input and output. All functionality is fully programmable and can be configured to save power in simple usage models requiring little or no audio manipulation or simple analog signal pass through. Dedicated voice DACs also provide a lower power option versus full audio output to headphones or speakers. In addition, by including the integrated 16Ω headphone and 8Ω stereo speaker drivers, the need for external power amplifiers is eliminated.

The integrated circuit described herein offers unmatched AM/FM receiver performance and adjustability, including excellent selectivity and sensitivity, tunable seek performance, and adjustable audio parameters for variable broadcast environments and user preferences. The FM transmitter provides digital capacitive antenna tuning to maximize voltage output in almost any system configuration. The FM transmitter also provides programmable dynamic gain compression and frequency deviation for maximum audio volume and signal strength on target receivers. Both the FM receiver and the FM transmitter can use a single, small integrated antenna, which the part automatically self-calibrates across the FM band for optimum transmit power or received signal strength.

In addition, European Radio Data Service (RDS) and US Radio Broadcast Data Service (RBDS) decoding, error correction and encoding can also provided through the operation of the DSP.

Applications for the integrated circuit described herein include but are note limited to cellular handsets, digital media players, portable gaming devices, portable navigation/GPS, portable radios/CD players, consumer electronics, countertop stereos/radios/docking stations.

In operation, the integrated circuits described herein provide a highly efficient integration of the AM receive, FM receive and/or FM transmit function with the stereo audio CODEC, headphone amplifier/driver, and/or stereo speaker driver. In addition, the preferred digital low-IF architecture of the AM receiver/FM receiver/FM transmitter allows the integrated circuit to offer a high quality stereo audio CODEC with two stereo channel inputs, and preamp and bias for microphone input with very little incremental silicon. The efficient reuse of functionality and circuitry described herein allows the integrated circuit to efficiently add the stereo headphone and speaker drivers, thus offering a complete AM receive, FM receive and FM transmit solution or combinations thereof, plus the audio CODEC and amplifier sub-system, in a single, very small and highly integrated die. The result is a significant reduction in required board space and BOM (build of materials) compared to existing solutions.

Figure 19:
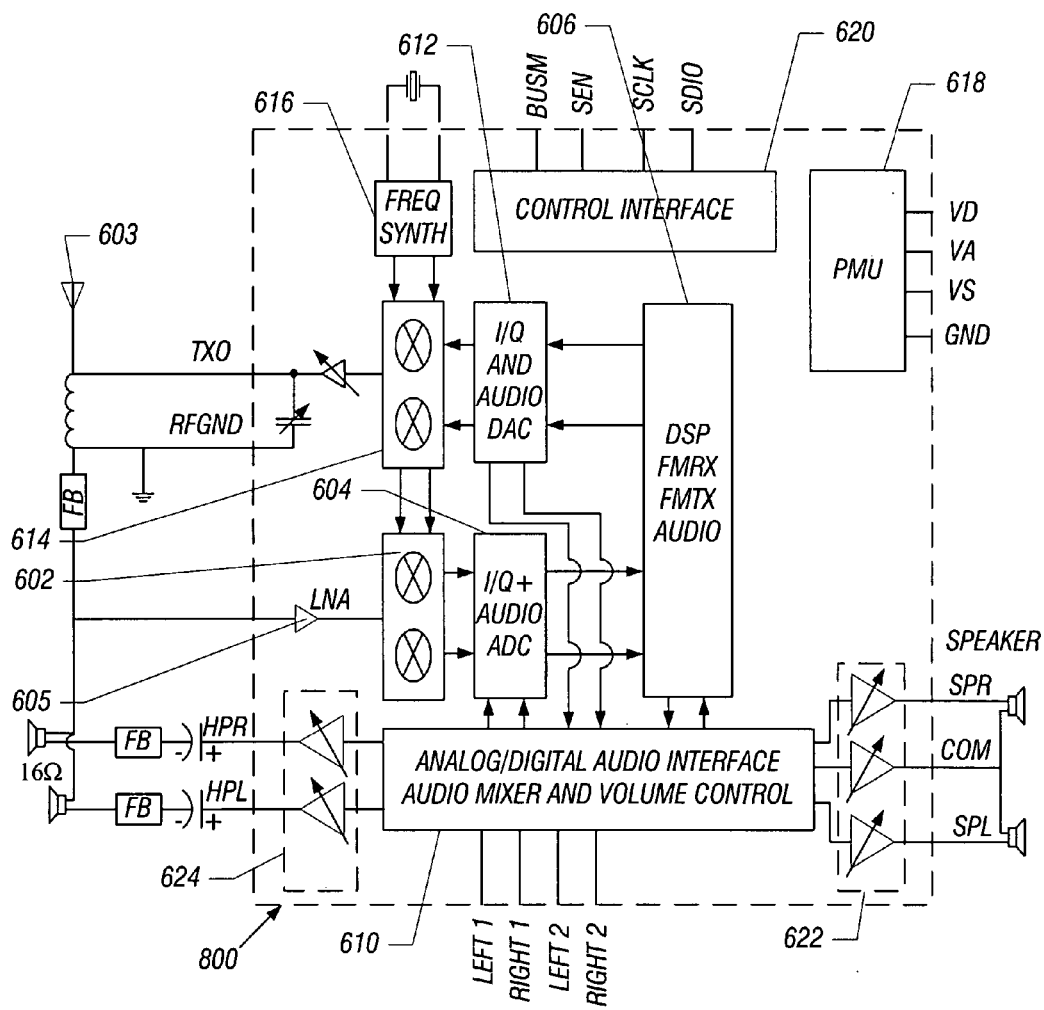

Other embodiments are within the scope of the appended claims. For example, other components of the integrated circuit may be reused in different modes of operation. As a more specific example, FIG. 19 depicts an integrated circuit 800 in accordance with some embodiments of the invention. In general, the integrated circuit 800 is a similar design to the integrated circuit 600 of FIG. 17, with the following differences. In particular, the integrated circuit 800 uses the DAC 612 for the additional function of converting the audio signals from the DSP 606 into analog signals, which are provided to the mixer 614. Thus, the integrated circuit 800 replaces the DAC 608 (see FIG. 17) of the integrated circuit 600 by reusing the DAC 612 for an additional function.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. An apparatus comprising:
    a processor adapted to:
        in a first mode of operation, operate as part of one a wireless receiver and a wireless transmitter; and
        in a second mode of operation, process a first audio band signal to generate a second audio band signal;
    a control interface to select one of the first and second modes of operation; and
    a semiconductor package containing the processor and the control interface.

2. The apparatus of claim 1, further comprising:
    a die in which the processor and the control interface are fabricated.

3. The apparatus of claim 1, further comprising:
    an analog-to-digital converter to provide a signal to the processor during both the first and second modes of operation.

4. The apparatus of claim 3, wherein the analog-to-digital converter is adapted to provide a base band signal to the processor during the first mode of operation.

5. The apparatus of claim 3, wherein the analog-to-digital converter is adapted to provide an audio band signal to the processor during the first mode of operation.

6. The apparatus of claim 1, further comprising:
    a digital-to-analog converter to receive a signal from the processor during both the first and second modes of operation.

7. The apparatus of claim 6, wherein the digital-to-analog converter is adapted to receive a frequency modulated signal from the processor during the first mode of operation.

8. The apparatus of claim 6, wherein the digital-to-analog converter is adapted to receive an audio band from the processor during the second mode of operation.

9. The apparatus of claim 1, wherein the processor is adapted to perform at least one of the following during the second mode of operation:
    audio equalization, multiple input mixing, noise cancellation, and automatic level control.

10. The apparatus of claim 1, further comprising:
    at least one amplifier to drive a headphone; and
    a die in which the processor, control interface and said at least amplifier are fabricated.

11. The apparatus of claim 1, further comprising:
at least one amplifier to drive at least one speaker; and
a die in which the processor, control interface and said at least one amplifier are fabricated.

12. The apparatus of claim 1, wherein the processor is adapted to operate both as part of an FM wireless receiver and an AM wireless receiver.

13. A method comprising:
providing a processor;
in a first mode of operation, operating the processor at part of one of a wireless receiver and a wireless transmitter;
in a second mode of operation, using the processor to process a first audio band signal to generate a second audio band signal
providing an analog-to-digital converter;
during both the first and second modes of operation of the processor, using the analog-to-digital converter to provide an input signal to the processor; and
integrating the analog-to-digital converter and the processor together in the same semiconductor package.

14. The method of claim 13, further comprising:
providing the processor as part of an AM receiver.

15. The method of claim 13, further comprising:
providing the processor as part of an FM receiver.

16. The method of claim 13, further comprising:
fabricating the analog-to-digital converter and the processor on the same semiconductor die.

17. The method of claim 13, further comprising:
providing a digital-to-analog converter; and
using the digital-to-analog converter to process a signal from the processor during the first and second modes of operation.

18. The method of claim 17, further comprising:
integrating the digital-to-analog converter and the processor together in the same semiconductor package.

19. The method of claim 17, further comprising:
fabricating the digital-to-analog converter and the processor on the same semiconductor die.

20. The method of claim 13, further comprising:
performing at least one of the following during the second mode of operation of the processor:
audio equalization, multiple input mixing, noise cancellation, and automatic level control.

21. The method of claim 13, further comprising:
providing an amplifier to drive a speaker; and
fabricating the processor and the amplifier in a semiconductor die.

22. The method of claim 13, further comprising:
providing an amplifier to drive a headphone; and
fabricating the processor and the amplifier in a semiconductor die.

23. A method comprising:
providing a processor;
in a first mode of operation, operating the processor at part of one of a wireless receiver and a wireless transmitter;
in a second mode of operation, using the processor to process a first audio band signal to generate a second audio band signal;
providing a digital-to-analog converter;
using the digital-to-analog converter to process a signal from the processor during the first and second modes of operation; and
integrating the digital-to-analog converter and the processor together in the same semiconductor package.

24. The method of claim 23, further comprising:
fabricating the digital-to-analog converter and the processor on the same semiconductor die.

25. The method of claim 23, further comprising providing the processor as part of at least one of an AM receiver or an FM receiver.

26. The method of claim 23, further comprising:
performing at least one of the following during the second mode of operation of the processor:
audio equalization, multiple input mixing, noise cancellation, and automatic level control.

* * * * *

UNITED STATES PATENT AND TRADEMARK OFFICE
CERTIFICATE OF CORRECTION

PATENT NO. : 8,174,415 B2
APPLICATION NO. : 11/824596
DATED : May 8, 2012
INVENTOR(S) : G. Tyson Tuttle et al.

It is certified that error appears in the above-identified patent and that said Letters Patent is hereby corrected as shown below:

Column 16:
Line 28, "one a" should be --one of a--

Column 17:
Line 10, "processor at" should be --processor as--

Column 18:
Line 16, "processor at" should be --processor as--

Signed and Sealed this
Twenty-eighth Day of August, 2012

David J. Kappos
*Director of the United States Patent and Trademark Office*